US012444072B1

(12) United States Patent
Niu et al.

(10) Patent No.: US 12,444,072 B1
(45) Date of Patent: Oct. 14, 2025

(54) DYNAMIC OBJECT DETECTION USING POSTURE DATA

(71) Applicant: Amazon Technologies, Inc., Seattle, WA (US)

(72) Inventors: Boshen Niu, San Mateo, CA (US); Shreekant Gayaka, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 776 days.

(21) Appl. No.: 17/522,557

(22) Filed: Nov. 9, 2021

(51) Int. Cl.
*G06T 7/70* (2017.01)
*G01S 17/931* (2020.01)
*G06T 7/20* (2017.01)
*G06V 20/10* (2022.01)
*G06V 40/10* (2022.01)

(52) U.S. Cl.
CPC ............... *G06T 7/70* (2017.01); *G06T 7/20* (2013.01); *G06V 20/10* (2022.01); *G06V 40/10* (2022.01); *G01S 17/931* (2020.01); *G06T 2207/10028* (2013.01); *G06T 2207/30196* (2013.01)

(58) Field of Classification Search
CPC ......... G06T 1/0014; G06T 2207/10028; G06T 2207/30196; G06T 7/20–7/292; G06T 7/70; G01S 17/931; G06V 20/56–20/588; G06V 20/58; G06V 20/36; G06V 40/23–40/25; G06V 20/10; G06V 40/10; B60W 30/08–30/0956; B60W 30/09; B60W 60/0027–60/00276; G08G 1/16–1/168; G08G 1/166; G05D 1/0246–1/0253; G05D 1/0088
See application file for complete search history.

(56) References Cited

U.S. PATENT DOCUMENTS

| | | | |
|---|---|---|---|
| 10,523,864 B2 * | 12/2019 | Harrison | G06V 40/10 |
| 10,706,321 B1 * | 7/2020 | Chen | G06T 3/4007 |
| 10,956,726 B1 * | 3/2021 | Quark | G06V 20/653 |
| 11,810,345 B1 * | 11/2023 | Gayaka | G06V 40/161 |
| 11,948,380 B1 * | 4/2024 | Jotwani | G06T 7/70 |
| 12,233,905 B2 * | 2/2025 | Armstrong-Crews | B60W 60/0011 |
| 2018/0211119 A1 * | 7/2018 | Liu | G06V 20/58 |
| 2018/0260636 A1 * | 9/2018 | Zou | G06T 7/521 |
| 2019/0080183 A1 * | 3/2019 | Li | G05D 1/0246 |
| 2019/0311546 A1 * | 10/2019 | Tay | G06T 7/521 |
| 2021/0117704 A1 * | 4/2021 | Yao | G06T 7/73 |
| 2021/0342772 A1 * | 11/2021 | Tiwari | G06K 7/1447 |
| 2022/0026920 A1 * | 1/2022 | Ebrahimi Afrouzi | B25J 9/1664 |

(Continued)

*Primary Examiner* — Mia M Thomas
(74) *Attorney, Agent, or Firm* — Pierce Atwood LLP

(57) ABSTRACT

Described herein is a system for improving dynamic object detection by including posture data. For example, the system may build an occupancy map representing objects present in an environment while tracking dynamic objects that should not be included in the occupancy map (e.g., people, pets, or other mobile objects). The system may classify a user as a dynamic object based on a posture indicated by Visual Perception (VP) data. For example, the VP data may distinguish between first postures (e.g., standing, walking, etc.) and second postures (e.g., sitting, laying down, etc.). Thus, the system can classify users associated with the first postures as dynamic objects to be removed from the occupancy map, while including users associated with the second postures in the occupancy map. Thus, the device removes humans from the occupancy map without removing furniture.

20 Claims, 22 Drawing Sheets

(56) References Cited

U.S. PATENT DOCUMENTS

| | | | |
|---|---|---|---|
| 2022/0148302 A1* | 5/2022 | Bao | G06V 10/761 |
| 2022/0300001 A1* | 9/2022 | Gayaka | G10L 15/08 |
| 2022/0309835 A1* | 9/2022 | Hu | G06T 7/246 |
| 2023/0213635 A1* | 7/2023 | Pazhayampallil | G01S 17/89 |
| | | | 702/97 |
| 2023/0326049 A1* | 10/2023 | Ambrus | G06N 3/0455 |
| | | | 382/100 |
| 2023/0406366 A1* | 12/2023 | Zhou | G05D 1/0214 |

* cited by examiner

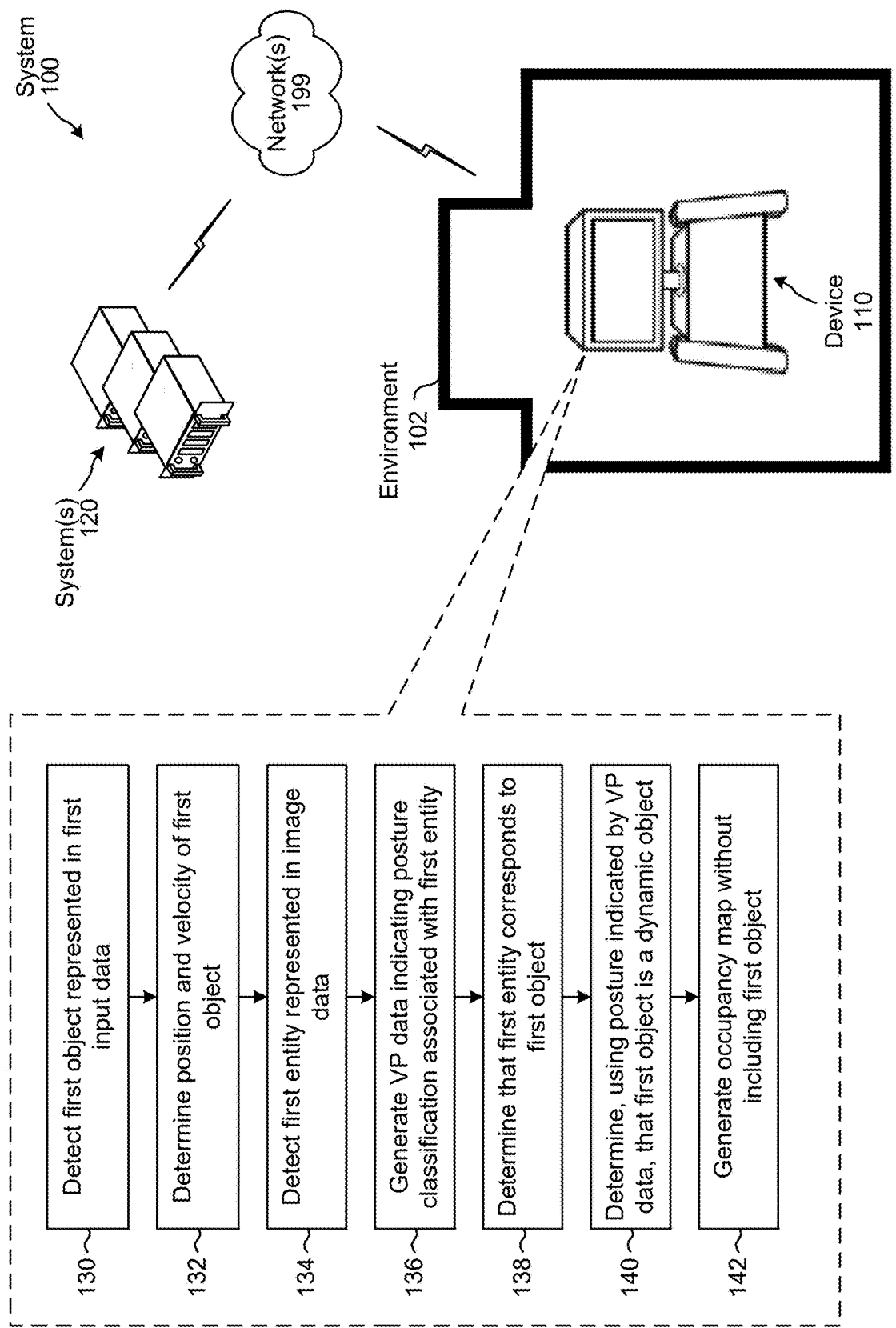

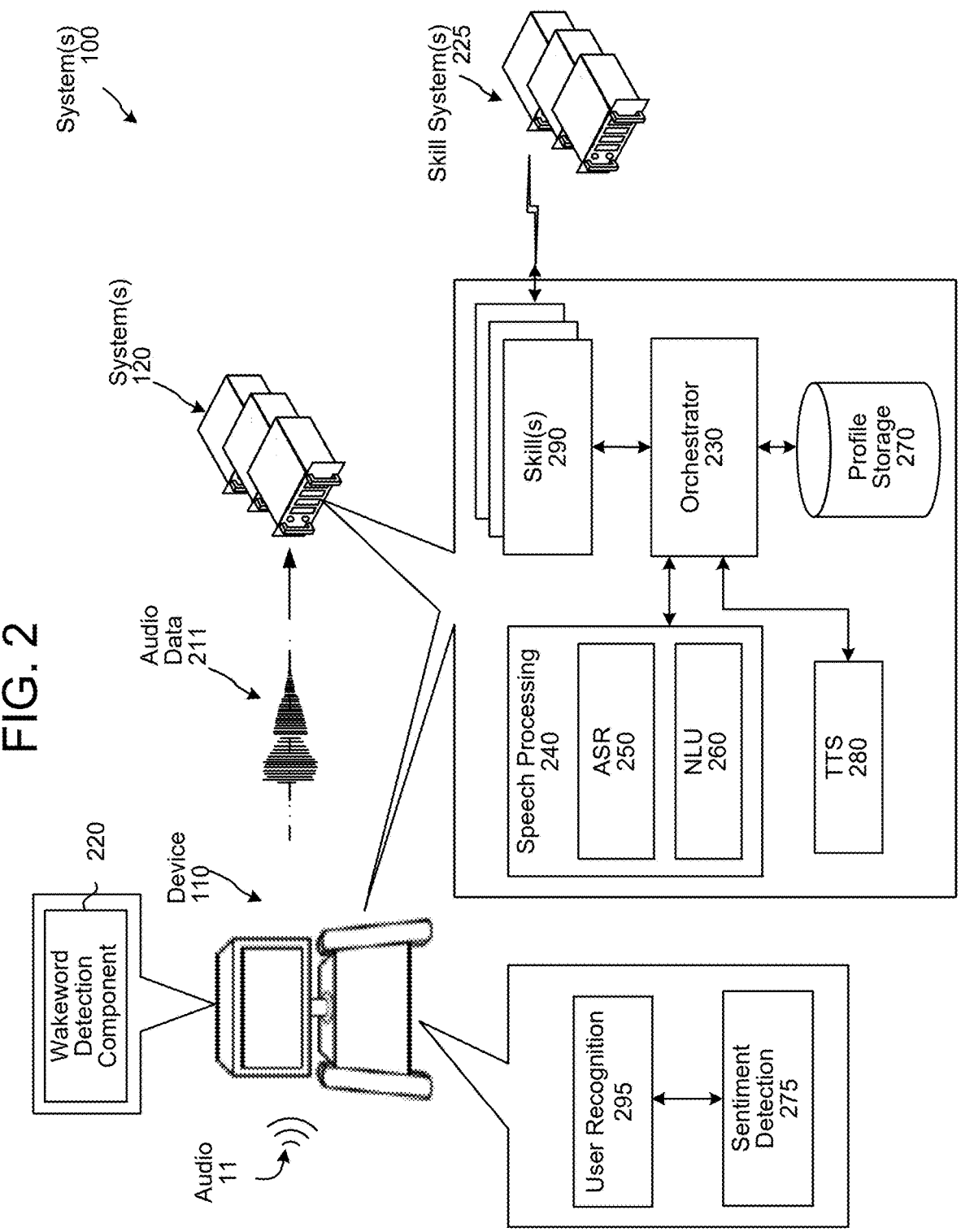

Device 110

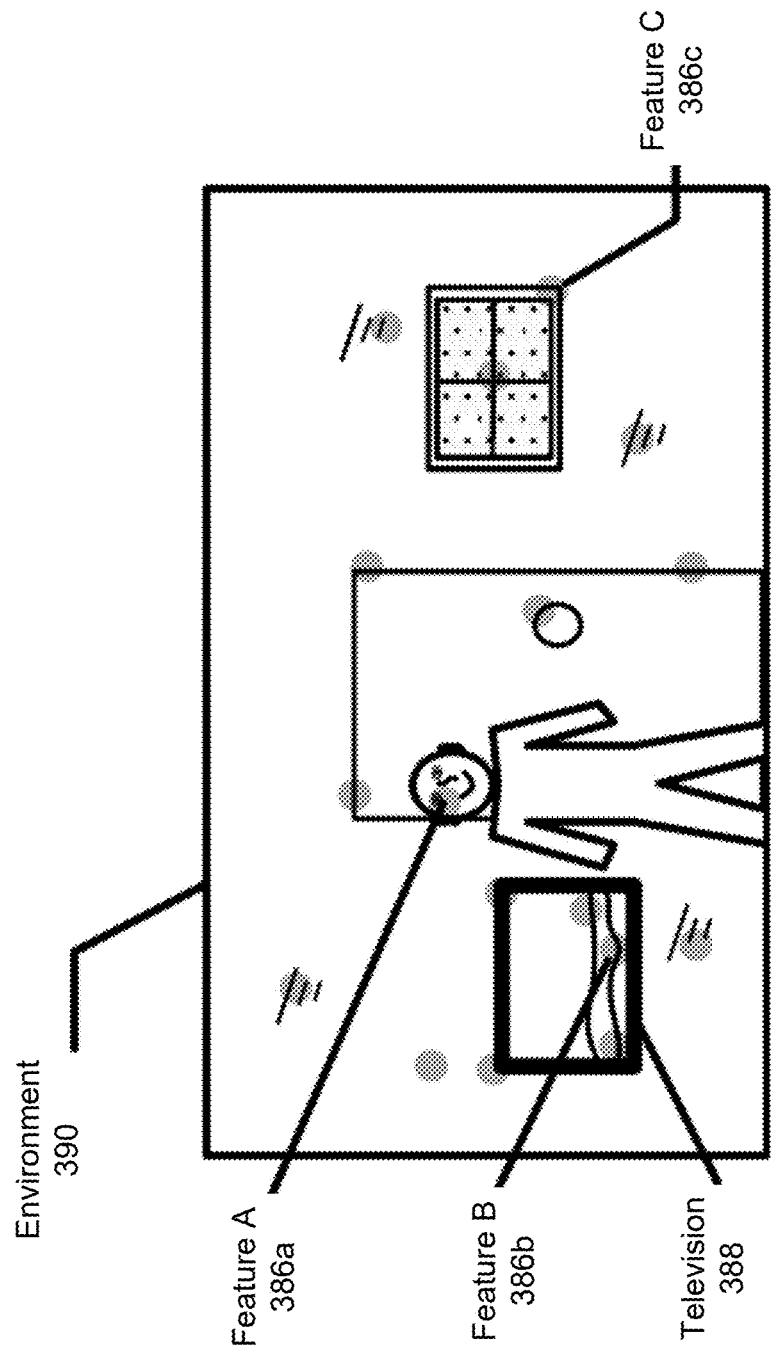

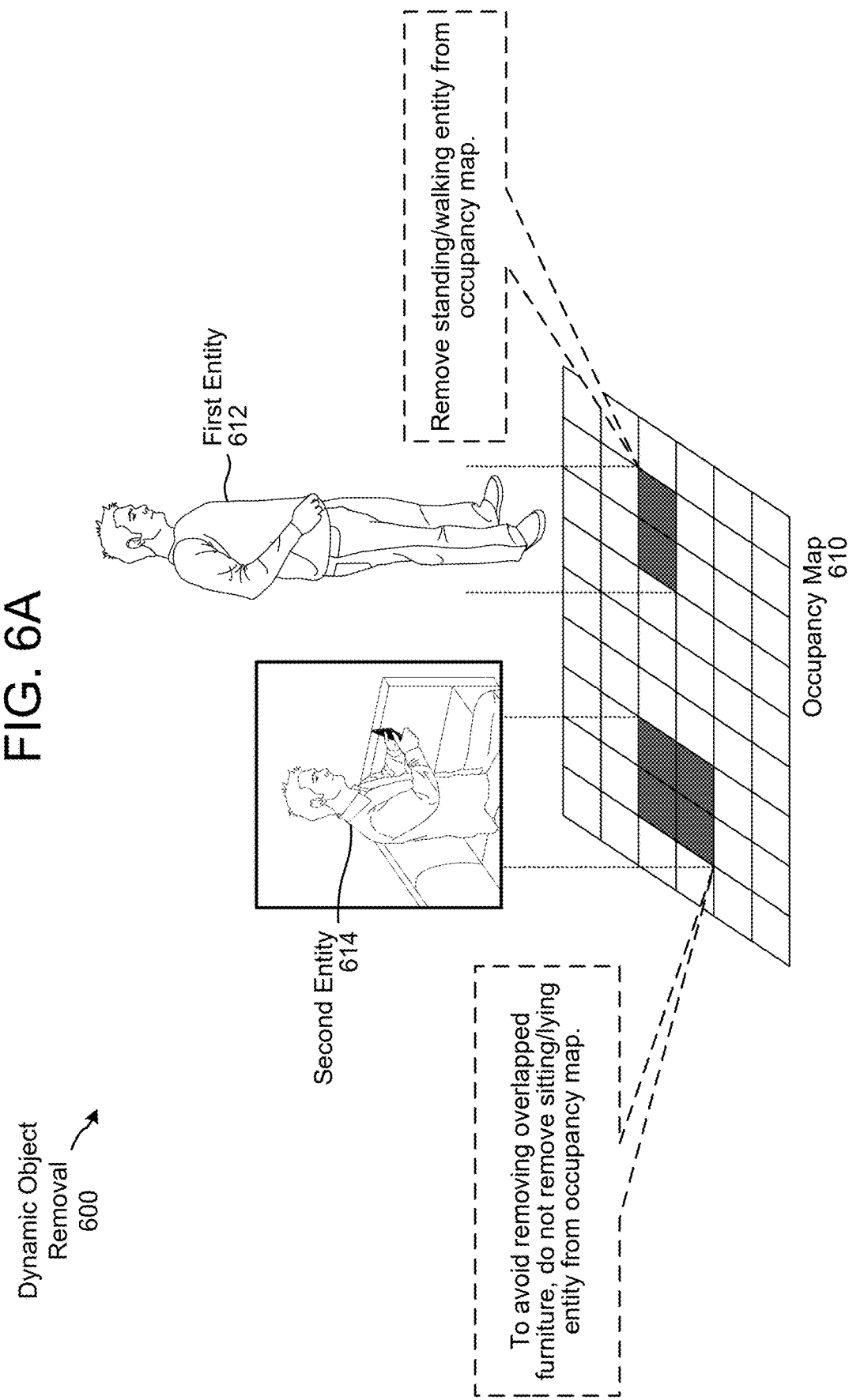

FIG. 6B
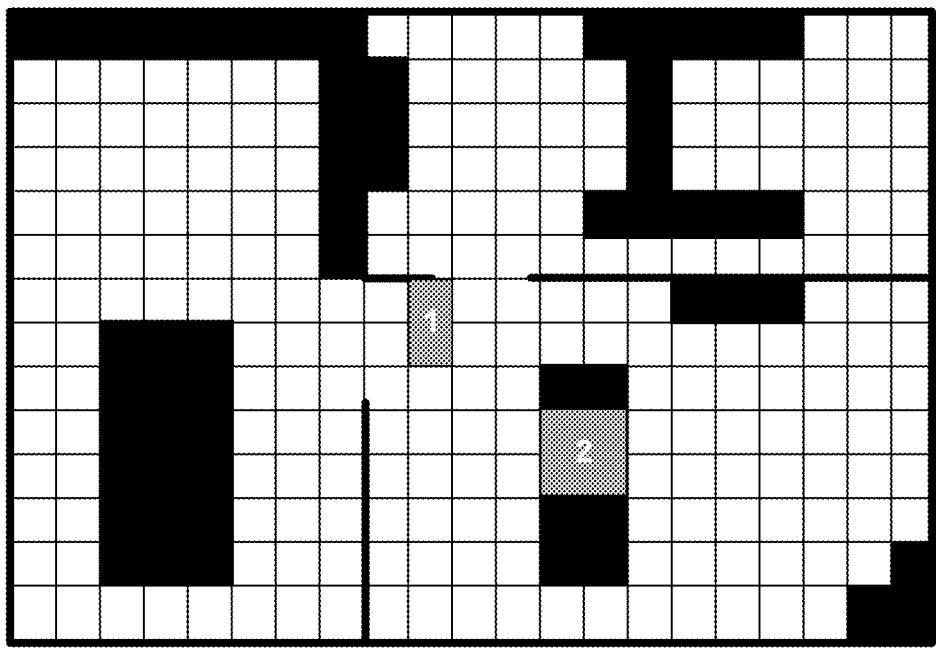
Raw Occupancy Map
620
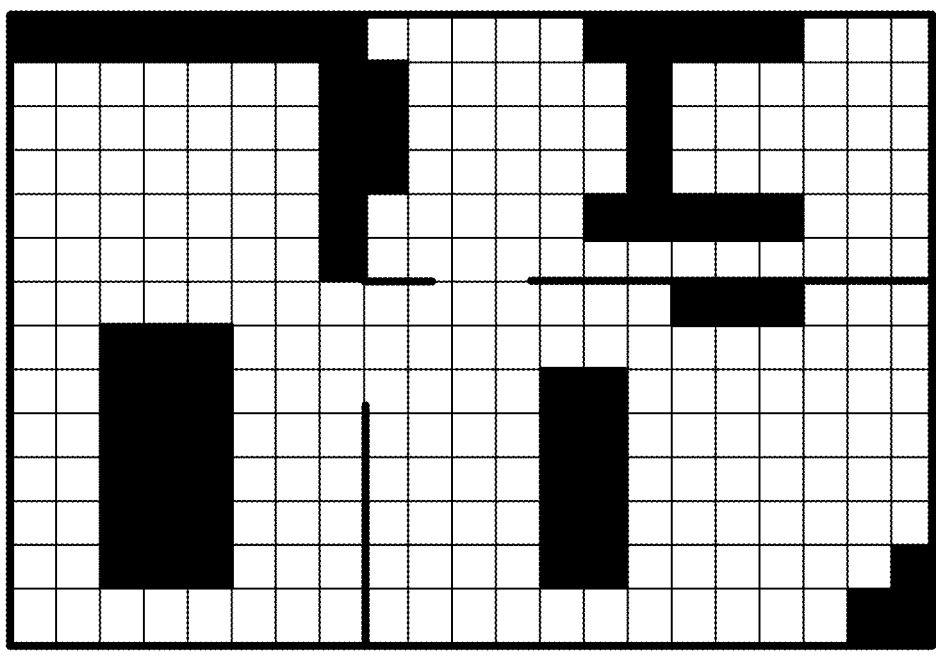
Final Occupancy Map
630

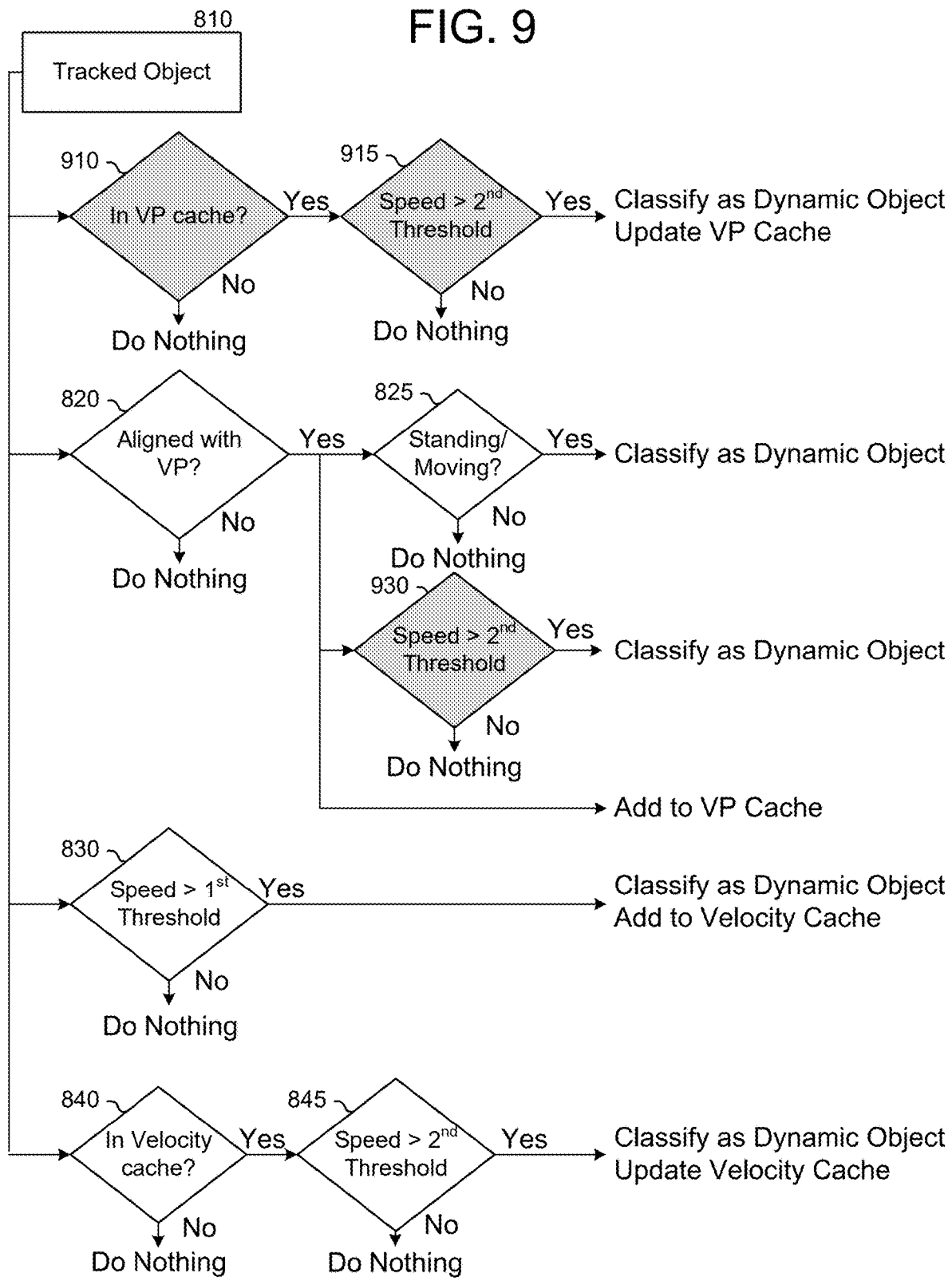

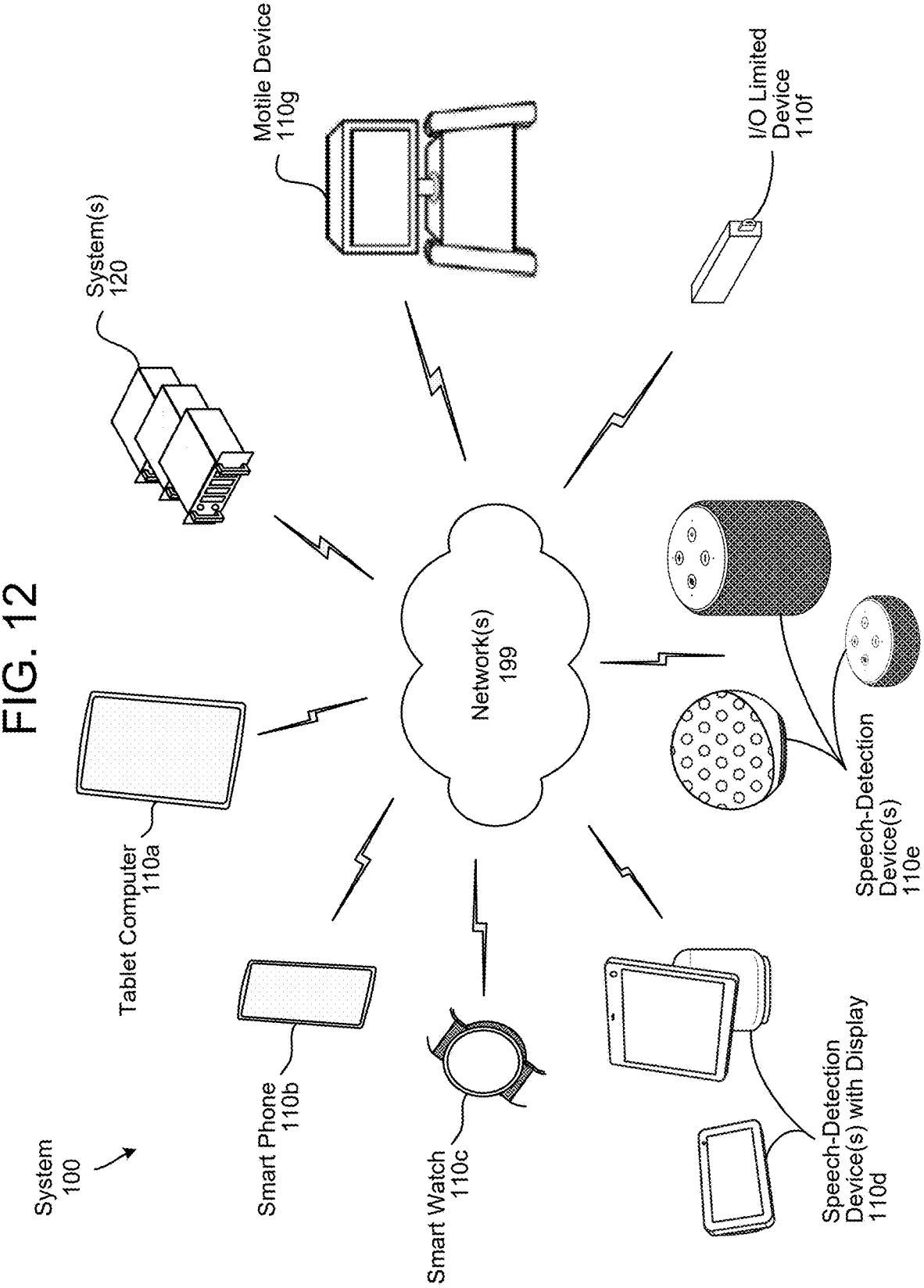

DYNAMIC OBJECT DETECTION USING POSTURE DATA

BACKGROUND

An autonomously motile device may be independently capable of moving within an environment. The autonomously motile device may further include one or more cameras that capture still and/or moving images. The autonomously motile device may use these images to navigate the environment.

BRIEF DESCRIPTION OF DRAWINGS

For a more complete understanding of the present disclosure, reference is now made to the following description taken in conjunction with the accompanying drawings.

FIG. 1 illustrates a system configured to perform dynamic object detection using posture data according to embodiments of the present disclosure.

FIG. 2 is a conceptual diagram of speech processing components of a system according to embodiments of the present disclosure.

FIGS. 3E and 3F illustrate images captured by an autonomously motile device in an environment according to embodiments of the present disclosure.

FIGS. 6A-6B illustrate examples of removing dynamic objects from occupancy maps according to embodiments of the present disclosure.

FIG. 9 is a decision tree illustrating a conceptual example of determining whether to classify an object as a dynamic object according to embodiments of the present disclosure.

FIG. 12 illustrates an example of a computer network for use with the overall system according to embodiments of the present disclosure.

DETAILED DESCRIPTION

Figure 3A:
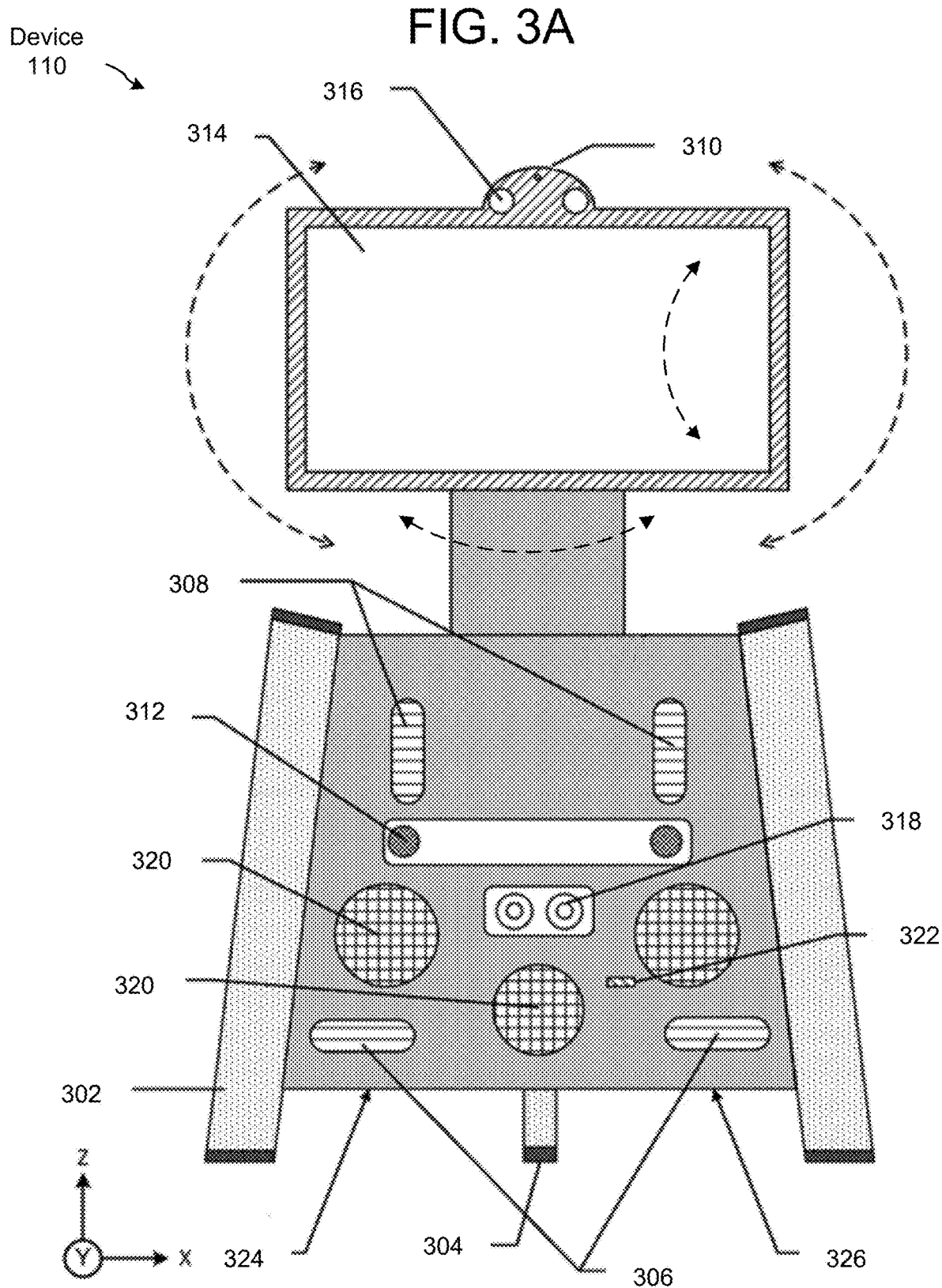
FIGS. 3A, 3B, and 3C illustrate views of an autonomously motile device according to embodiments of the present disclosure.

A motile device may include one or more sensors configured to generate sensor data that is indicative of the presence of objects and the relative positions, shapes, and so forth that are visible to the sensor. Data from the sensor may be used to generate an occupancy map or other environment map representing the environment and/or for navigation by the motile device within the environment. For example, the occupancy map may represent stationary objects and/or obstacles (e.g., walls, furniture, and/or other objects) that may impede navigation of the device within the environment.

To improve the occupancy map, the device may detect dynamic objects in the environment and remove them from the occupancy map. A dynamic object is an object that is moving and/or temporarily occupying a location and not a static obstacle present in the environment. As dynamic objects are only temporarily occupying a location in the environment, the occupancy map may only represent fixed obstacles such as a stationary object, furniture, a wall, and/or the like that will not move. Typically, a person moves around the environment and is not a static obstacle or stationary object, so the device may classify a human as a dynamic object. However, if a person is sitting or lying on furniture or other obstacles, classifying the person as a dynamic object may result in the device removing the furniture or other obstacles from the occupancy map by mistake.

To improve navigation and/or generation of an occupancy map, a system may perform dynamic object classification using posture data. The system may build an occupancy map representing objects present in an environment while tracking dynamic objects that should not be included in the occupancy map (e.g., people, pets, or other mobile objects). The system may classify a person as a dynamic object based on a posture indicated by the posture data. For example, the system may determine a posture classification associated with the person and classify the person as a dynamic object based on the posture classification. Thus, the system may distinguish between first postures (e.g., standing, walking, etc.) and second postures (e.g., sitting, laying down, etc.), enabling the system to classify users associated with the first postures as dynamic objects to be removed from the occupancy map, while including users associated with the second postures in the occupancy map. Thus, the system removes humans from the occupancy map without removing furniture or other obstacles.

FIG. 1 illustrates a system configured to perform dynamic object detection using posture data according to embodiments of the present disclosure. Although the figures and discussion illustrate certain operational steps of the system in a particular order, the steps described may be performed in a different order (as well as certain steps removed or added) without departing from the intent of the disclosure. In various embodiments, the device 110 may communicates with system(s) 120 using network(s) 199.

As illustrated in FIG. 1, the system 100 may include a device 110 in an environment 102, and one or more system(s) 120 connected across one or more network(s) 199. In some examples, the system(s) 120 may be associated with a first location that is remote from a second location associated with the device 110. Thus, the device 110 may communicate with the system(s) 120 using a plurality of different networks. However, the disclosure is not limited thereto and in some examples, the system(s) 120 may be associated with the second location in proximity to the device 110 without departing from the disclosure. For example, the system(s) 120 may correspond to a home server and the device 110 may communicate with the system(s) 120 using a single local area network (LAN) or wireless local area network (WLAN). The operations are generally described herein as being performed by the device 110. However, it should be understood that one or more of the operations may also be performed by the system(s) 120.

In some examples, the device 110 may be motile (e.g., capable of motion) and may be referred to as a motile device, autonomously motile device, etc., although the disclosure is not limited thereto. Thus, the device 110 may be capable of moving within the environment 102 independently of a user without departing from the disclosure, enabling the device 110 to perform additional actions by moving towards the user, relative to the user, traveling within the environment 102, and/or the like without departing from the disclosure. For example, the device 110 may be at a first location within the environment 102 and may move to a second location within the environment 102 to perform an action.

The device 110 may be capable of autonomous motion using one or motors powering one or more wheels, treads, robotic limbs, or similar actuators, but the present disclosure is not limited to particular method of autonomous movement/motion. The device 110 may, for example, follow a user around a room, may explore the room, and/or perform additional actions without departing from the disclosure.

The device 110 may further include one or more sensors; these sensors may include, but are not limited to, a light based time-of-flight sensor, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. The disclosure is not, however, limited to only these devices or components, and the device 110 may include additional components without departing from the disclosure.

A light based time-of-flight sensor, such as a Light Detection and Ranging (lidar) sensor, may be configured to provide distance information by utilizing laser light. For example, the laser is scanned across an environment at various points, emitting pulses which may be reflected by objects within the environment. Based on the time-of-flight distance to that particular point, sensor data may be generated that is indicative of the presence of objects and the relative positions, shapes, and so forth that are visible to the sensor. Data from the sensor may be used to generate an occupancy map or other environment map representing the environment and/or for navigation by the motile device within the environment.

To navigate throughout the environment 102, the device 110 may generate an occupancy map representing potential obstacles in the environment 102. For example, the occupancy map may represent a map of the environment using a grid having a plurality of grid units (which may also be referred to as cells). The grid may be two- or three-dimensional; each grid unit or cell may be, for example, one meter on each side, although the disclosure is not limited thereto. The occupancy map may represent stationary objects and/or obstacles (e.g., walls, furniture, and/or other objects) that may impede navigation of the device 110 within the environment 102. For example, first cells in the occupancy map may have a first value indicating that the cell is occupied (e.g., an obstacle is present), while second cells in the occupancy map may have a second value indicating that the cell is not occupied (e.g., no obstacles are present).

To generate the occupancy map, the device 110 may travel within the environment 102 and capture the environment 102 using one or more sensors (e.g., lidar sensor, camera, depth sensor, and/or the like). In some examples, the device 110 may generate input scan data of the environment 102 as part of an explicit enrollment or initialization period (e.g., home tour). For example, if the device 110 is motile, the device 110 may conduct a tour to explore the environment 102 in order to generate raw input scans that may be used to generate the occupancy map, an environment map, and/or the like representing the environment 102. However, the disclosure is not limited thereto, and in other examples the device 110 may generate the input scan data while navigating the environment 102 while performing an action without departing from the disclosure.

As part of capturing the environment 102, the device 110 may generate point cloud data based on input scan data generated by the one or more sensors. For example, the device 110 may use the lidar sensor, the depth sensor, and/or the like to generate the point cloud data directly from input scans generated by the one or more sensors. However, the disclosure is not limited thereto, and in some examples the device 110 may capture image data using one or more cameras and generate the point cloud data based on the image data without departing from the disclosure.

The point cloud data may represent a plurality of target locations (e.g., potential obstacles or objects) detected by the one or more sensors. For example, the device 110 may process the input scan data to generate a point cloud representing the target locations of potential obstacles in the environment. In some examples, the point cloud data may indicate the target locations using absolute values. For example, the point cloud data may represent the target locations using two-dimensional (2D) or three-dimensional (3D) coordinates that indicate a specific location within the environment. However, the disclosure is not limited thereto, and in other examples the point cloud data may indicate the target locations using relative values. For example, the point cloud data may represent the target locations using distance measurements and/or angle measurements that indicate a relative position of the target location (e.g., relative to a location of the device 110 within the environment at the time that the measurement was generated) without departing from the disclosure. Thus, the point cloud data may correspond to raw input scans (e.g., relative positions) output by the one or more sensors or processed input scans (e.g., absolute position) generated by processing the raw input scans without departing from the disclosure.

To improve the occupancy map, the device 110 may detect dynamic objects in the environment and remove them from the occupancy map. As used herein, a dynamic object is an object that is moving and/or temporarily occupying a location and not a static obstacle present in the environment. As dynamic objects are only temporarily occupying a location in the environment, the occupancy map may only represent fixed obstacles such as a stationary object, furniture, a wall, and/or the like that will not move.

In some examples, the device 110 may classify dynamic objects based on movement of the object. For example, the device 110 may determine a speed value (e.g., rate of change component associated with velocity) of an object and classify the object as a dynamic object when the speed value exceeds a threshold. Thus, the device 110 may classify an inanimate object as a dynamic object while the object is in motion, but will stop classifying the object as a dynamic object when the object is at rest. The disclosure is not limited thereto, however, and the device 110 may classify objects as dynamic objects using other techniques without departing from the disclosure.

Typically, a person moves around the environment and is not a static obstacle or stationary object. Thus, in some examples the device 110 may classify a human as a dynamic object. However, if a person is sitting or lying on furniture or other obstacles, classifying the person as a dynamic object may result in the device 110 removing the furniture or other obstacles from the occupancy map by mistake. For example, if the person is sitting on a chair at a first location and the device 110 classifies the person as a dynamic object, the device 110 may remove the person and the chair from the occupancy map. Thus, if the person moves from the first location, the occupancy map may indicate that the first location is not occupied, despite the chair remaining at the first location.

To improve navigation and/or the occupancy map, the device 110 may determine a posture classification associated with a person and classify the person as a dynamic object based on the posture classification. For example, the device 110 may distinguish between a first posture classification (e.g., standing, walking, and/or the like) and a second posture classification (e.g., sitting, lying, and/or the like) and may only classify an object associated with the first posture classification as a dynamic object.

The first posture classification may correspond to a person that is temporarily occupying an otherwise unoccupied location in the environment (e.g., location that is not associated with a fixed obstacle such as a stationary object, furniture, a wall, and/or the like), such as when a person is moving through the environment and/or standing in open space. In contrast, the second posture classification may correspond to a person that is occupying an otherwise occupied location in the environment (e.g., location that is associated with a fixed obstacle such as a stationary object, furniture, and/or the like), such as when a person is sitting or lying on furniture or other objects.

To determine the posture classification, the device 110 may generate image data using one or more cameras and may detect human(s) represented in the image data. For example, the device 110 may generate image data in one or more directions using the one or more cameras while navigating around the environment. In some examples, the device 110 may use computer vision processing to detect one or more humans represented in the image data. For example, the device 110 may process the image data by performing object detection processing, object recognition processing, pose estimation processing, and/or the like, although the disclosure is not limited thereto and the device 110 may detect the human(s) using other techniques without departing from the disclosure. The device 110 may track each human detected in the image data as a separate entity.

The device 110 may determine visual perception (VP) data associated with entities present in the environment. For example, the device 110 may track each human detected in the image data as an individual entity and may generate VP data corresponding to each of the entities. In some examples, the device 110 may process the image data representing the human(s) and generate VP data that includes descriptive information associated with an entity during a period of time. For example, the VP data may include a current location of the entity, a posture classification indicating a current posture associated with the person detected in the image data, an identity of the entity (e.g., user profile, identification, and/or the like associated with the person detected in the image data), and/or the like, although the disclosure is not limited thereto and the VP data may include additional information without departing from the disclosure.

To illustrate a simple example, the device 110 may generate VP data that includes the current location of an entity along with a posture classification that indicates a current posture associated with the entity. In some examples, the device 110 may distinguish between the first posture classification (e.g., moving/standing) and the second posture classification (e.g., sitting/lying) without departing from the disclosure. However, the disclosure is not limited thereto and the device may distinguish between any number of posture classifications without departing from the disclosure.

When a first entity (e.g., first person) associated with the first posture classification moves from a first location, the first location becomes unoccupied (e.g., free or open) and the device 110 may navigate unimpeded through the first location. Thus, the device 110 may classify the first entity as a dynamic object and remove the first entity from the occupancy map as the first entity is capable of movement and there are no other obstacles at the first location. In contrast, when a second entity (e.g., second person) associated with the second posture classification moves from a second location, furniture or other objects remain at the second location, leaving obstacle(s) that prevent the device 110 from successfully navigating through the second location. If the device 110 classified the second entity as a dynamic object, the device 110 would remove the furniture on which the second entity is sitting or lying from the occupancy map when the second entity moved from the second location. Thus, the device 110 should not classify the second entity as a dynamic object in order to avoid errantly removing the furniture from the occupancy map.

As illustrated in FIG. 1, the device 110 may detect (130) a first object represented in first input data and may determine (132) a position and velocity of the first object. For example, the device 110 may generate point cloud data representing obstacles present in the environment, may perform clustering to identify individual objects represented in the point cloud data, and may determine the position and the velocity associated with a first cluster corresponding to the first object, as described in greater detail below with regard to FIG. 5.

The device 110 may detect (134) a first entity represented in image data and may generate (136) VP data indicating a posture classification associated with first entity. For example, the device 110 may generate the image data and may process the image data using a first model to generate VP data that includes descriptive information associated with an entity during a period of time. In some examples, the device 110 may distinguish between a first posture classification (e.g., moving), a second posture classification (e.g., standing), a third posture classification (e.g., sitting), a fourth posture classification (e.g., lying), and/or additional postures classification (e.g., squatting, running, etc.) without departing from the disclosure. However, the disclosure is not limited thereto and the device 110 may distinguish between only two posture classifications without departing from the disclosure. Additionally or alternatively, the VP data may include additional information about the current posture without departing from the disclosure.

The device 110 may determine (138) that the first entity corresponds to the first object and may determine (140), using the posture classification indicated by the VP data, that the first object is a dynamic object. For example, the device 110 may determine that the first entity included in the VP data is in the same location as the first object and may associate the first entity with the first object. Thus, the device 110 may combine the VP data, which provides detailed posture information, with object data, which provides accurate tracking information (e.g., precise locations). Using the VP data associated with the first entity, the device 110 may determine that the first object is associated with a posture classification that is corresponds to a dynamic object (e.g., standing, walking, and/or the like). As the first object is classified as a dynamic object, the device 110 may generate (142) an occupancy map without including the first object.

The overall system of the present disclosure may operate using various components as illustrated below. The various components may be located on same or different physical devices. Communication between various components may occur directly or across a network(s) 199.

As shown in FIG. 2, an audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa." While not illustrated in FIG. 2, in some examples the device 110 may detect wake gestures (e.g., hand motion, wave, etc.) using image data without departing from the disclosure.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120. In some embodiments, the device 110 may begin transmitting audio data 211 to system(s) 120 (or otherwise performing further processing on audio data) in response to an event occurring or an event being detected by the device 110.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 may perform speech processing to generate speech processing output data, which may be referred to as lexical data. In some examples, the lexical data may correspond to text data that includes text representing speech contained in the input audio data 211. However, the disclosure is not limited thereto and the lexical data may also correspond to token data that includes tokens that represent sounds, words, phrases, and/or the like corresponding to the speech. Thus, the lexical data may correspond to text data, token data, and/or other data known to one of skill in the art without departing from the disclosure. For ease of illustration, the disclosure may refer to the lexical data (e.g., speech processing output data) as text data, although the disclosure is not limited thereto.

To illustrate an example, the ASR component 250 may transcribe the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (e.g., lexical data, text data, etc.) and attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Mozart music," the NLU component 260 may determine an intent that the system(s) 120 output music and may identify "Mozart" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

The functionality described herein as a skill or skill component may be referred to using many different terms, such as an action, bot, app, application, speechlet or the like. A skill 290 may include hardware, software, firmware, or the like that may be dedicated to the particular skill 290 or shared among different skills 290. A skill 290 may be part of the system(s) 120 (as illustrated in FIG. 2) or may be located at whole (or in part) with one or more separate systems. Unless expressly stated otherwise, reference to a skill, skill device, or skill component may include a skill component operating within the system(s) 120 (for example as skill 290) and/or skill component operating within a system separate from the system(s) 120.

A skill 290 may be configured to perform one or more actions. A skill 290 may be enabled to execute specific functionality in order to provide data or produce some other output requested by a user. A particular skill component may be configured to execute more than one skill. For example, a weather skill may involve a weather skill component providing weather information to the system(s) 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, gaming skills, as well as custom skills that are not associated with any pre-configured type of skill.

In addition or alternatively to being implemented by the system(s) 120, a skill 290 may be implemented by a skill system(s) 225. Such may enable a skill system(s) 225 to execute specific functionality in order to provide data or perform some other action requested by a user.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110, the system(s) 120, and/or the skill system 225 may include profile storage 270 without departing from the disclosure. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may also include a sentiment detection component 275 that may be configured to detect a sentiment of a user from audio data representing speech/utterances from the user, image data representing an image of the user, and/or the like. The sentiment detection component 275 may be a separate component, as illustrated in FIG. 2, although the disclosure is not limited thereto and the sentiment detection component 275 may be included in other components without departing from the disclosure. The sentiment detection component 275 and other components are generally described as being operated by the device 110, as illustrated in FIG. 2. However, the system(s) 120 may also operate one or more of the components, including the sentiment detection component 275, without departing from the disclosure.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The device 110 may include a user recognition component 295 that recognizes one or more users using a variety of data without departing from the disclosure. However, the disclosure is not limited thereto, and the system(s) 120 may include a user recognition component 295 instead of and/or in addition to the device 110 without departing from the disclosure.

While FIG. 2 illustrates the system(s) 120 including a speech processing component 240, the disclosure is not limited thereto and in some examples the device 110 may include a speech processing component 240 without departing from the disclosure. For example, the device 110 may perform basic speech processing locally, while the system(s) 120 may perform full speech processing remotely. However, the disclosure is not limited thereto and the device 110 may perform full speech processing locally without departing from the disclosure. As described above, the system(s) 120 may be located at a first location associated with the device 110 and/or a second location that is not associated with the device 110 without departing from the disclosure. For example, the system(s) 120 may be a home server or other device connected to the device 110 via a local area network (LAN) without departing from the disclosure. Thus, performing speech processing remotely refers to any speech processing that is not performed by the device 110, even if the speech processing is performed by a device/server in close proximity to the device 110.

Additionally or alternatively, one of skill in the art would understand that the speech processing component 240 may include a spoken language understanding (SLU) component, in addition to and/or instead of the ASR component 250 and/or the NLU component 260, without departing from the disclosure.

FIG. 3A illustrates a front view of the device 110 according to various embodiments of the present disclosure. The device 110 includes wheels 302 that are disposed on left and right sides of the device 110. The wheels 302 may be canted inwards toward an upper structure of the device 110. In other embodiments, however, the wheels 302 may be mounted vertically (e.g., not canted). A caster 304 (e.g., a smaller wheel) may disposed along a midline of the device 110. The front section of the device 110 may include a variety of external sensors. A first set of optical sensors 306, for example, may be disposed along the lower portion of the front of the device 110, and a second set of optical sensors 308 may be disposed along an upper portion of the front of the device 110. A microphone array 310 may be disposed on a top surface of the device 110; the microphone array 310 may, however, be disposed on any surface of the device 110.

One or more cameras 312 may be mounted to the front of the device 110; two cameras 312a/312b, for example, may be used to provide for stereo vision. The distance between the two cameras 312 may be, for example, 5-15 centimeters; in some embodiments, the distance is 10 centimeters. In some embodiments, the cameras 312 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may provide for the device 110 to more easily detect objects when rotating or turning.

The cameras 312, which may be used for navigation, may be of different resolution from, or sensitive to different wavelengths than, other cameras used for other purposes, such as video communication. For example, the navigation cameras 312 may be sensitive to infrared light allowing the device 110 to operate in darkness or semi-darkness, while a camera 316 mounted above a display 314 may be sensitive to visible light and may be used to generate images suitable for viewing by a person. A navigation camera 312 may have a resolution of at least 300 kilopixels each, while the camera 316 mounted above the display 314 may have a resolution of at least 10 megapixels. In other implementations, navigation may utilize a single camera.

The cameras 312 may operate to provide stereo images of the environment, the user, or other objects. For example, an image from the camera 316 disposed above the display 314 may be accessed and used to generate stereo-image data corresponding to a face of a user. This stereo-image data may then be used for facial recognition, posture recognition, user identification, gesture recognition, gaze tracking, and other uses. In some implementations, a single camera 316 may be disposed above the display 314.

The display 314 may be mounted on a movable mount. The movable mount may allow the display to move along one or more degrees of freedom. For example, the display 314 may tilt, pan, change elevation, and/or rotate. In some embodiments, the display 314 may be approximately 20 centimeters as measured diagonally from one corner to another. An ultrasonic sensor 318 may be mounted on the front of the device 110 and may be used to provide sensor data that is indicative of objects in front of the device 110.

One or more loudspeakers 320 may be mounted on the device 110, and the loudspeakers 320 may have different audio properties. For example, low-range, mid-range, and/or high-range loudspeakers 320 may be mounted on the front of the device 110. The loudspeakers 320 may be used to provide audible output such as alerts, music, human speech such as during a communication session with another user, and so forth.

Other output devices 322, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 324, 326 may be disposed on the underside of the device 110. The floor optical-motion sensors 324, 326 may provide indication indicative of motion of the device 110 relative to the floor or other surface underneath the device 110. In some embodiments, the floor optical-motion sensors 324, 326 comprise a light source, such as light-emitting diode (LED) and/or an array of photodiodes. In some implementations, the floor optical-motion sensors 324, 326 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 324, 326 may provide other information, such as data indicative of a pattern present on the floor, composition of the floor, color of the floor, and so forth. For example, the floor optical-motion sensors 324, 326 may utilize an optoelectronic sensor that may detect different colors or shades of gray, and this data may be used to generate floor characterization data.

Figure 3B:
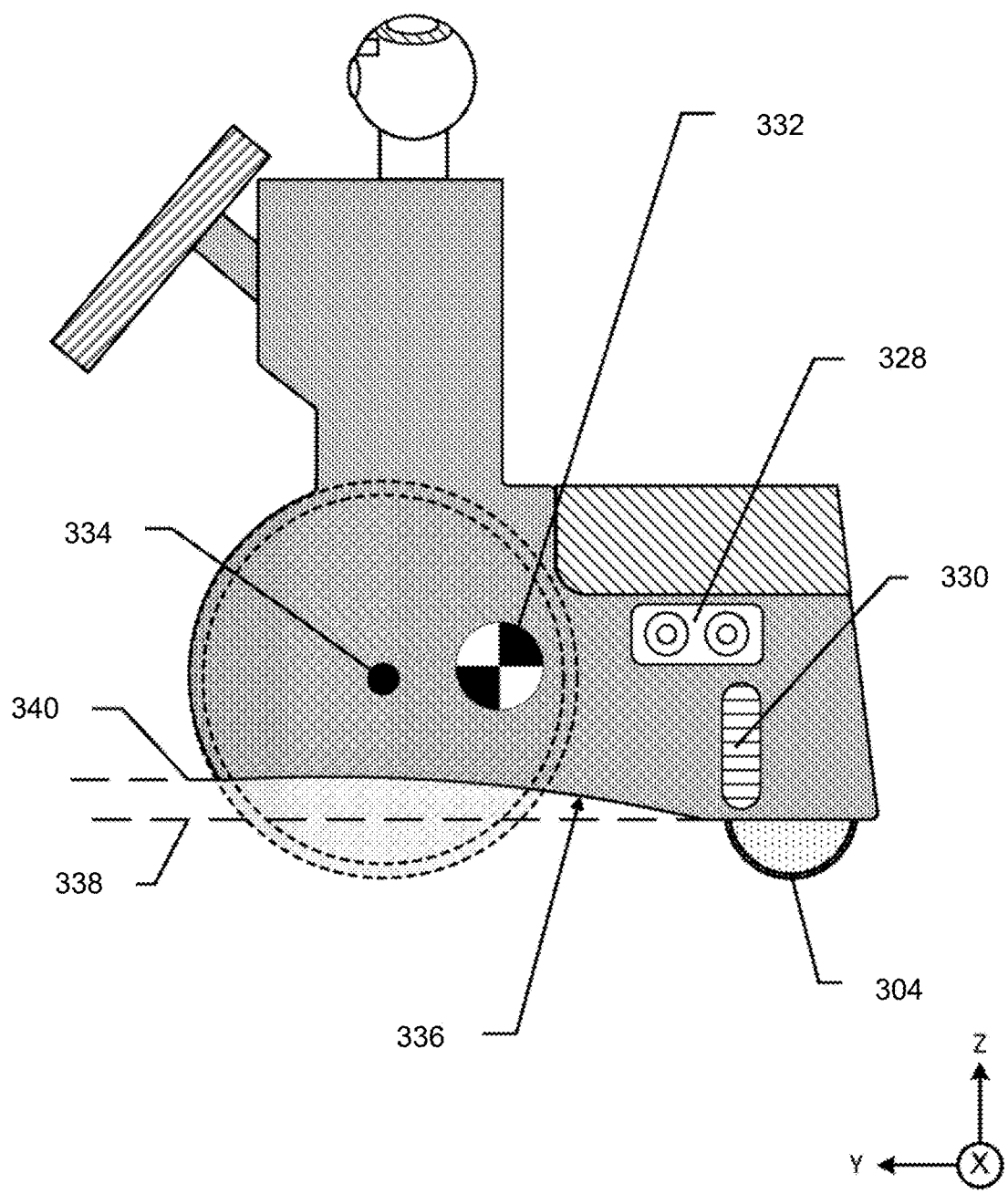

FIG. 3B illustrates a side view of the device 110 according to various embodiments of the present disclosure. In this side view, the left side of the device 110 is illustrated. An ultrasonic sensor 328 and an optical sensor 330 may be disposed on either side of the device 110.

The disposition of components of the device 110 may be arranged such that a center of gravity 332 is located between a wheel axle 334 of the front wheels 302 and the caster 304. Such placement of the center of gravity 332 may result in improved stability of the device 110 and may also facilitate lifting by a carrying handle.

In this illustration, the caster 304 is shown in a trailing configuration, in which the caster 304 is located behind or aft of the wheel axle 334 and the center of gravity 332. In another implementation (not shown) the caster 304 may be in front of the axle of the wheels 302. For example, the caster 304 may be a leading caster 304 positioned forward of the center of gravity 332.

The device 110 may encounter a variety of different floor surfaces and transitions between different floor surfaces during the course of its operation. A contoured underbody 336 may transition from a first height 338 at the front of the device 110 to a second height 340 that is proximate to the caster 304. This curvature may provide a ramp effect such that, if the device 110 encounters an obstacle that is below the first height 338, the contoured underbody 336 helps direct the device 110 over the obstacle without lifting the driving wheels 302 from the floor.

Figure 3C:
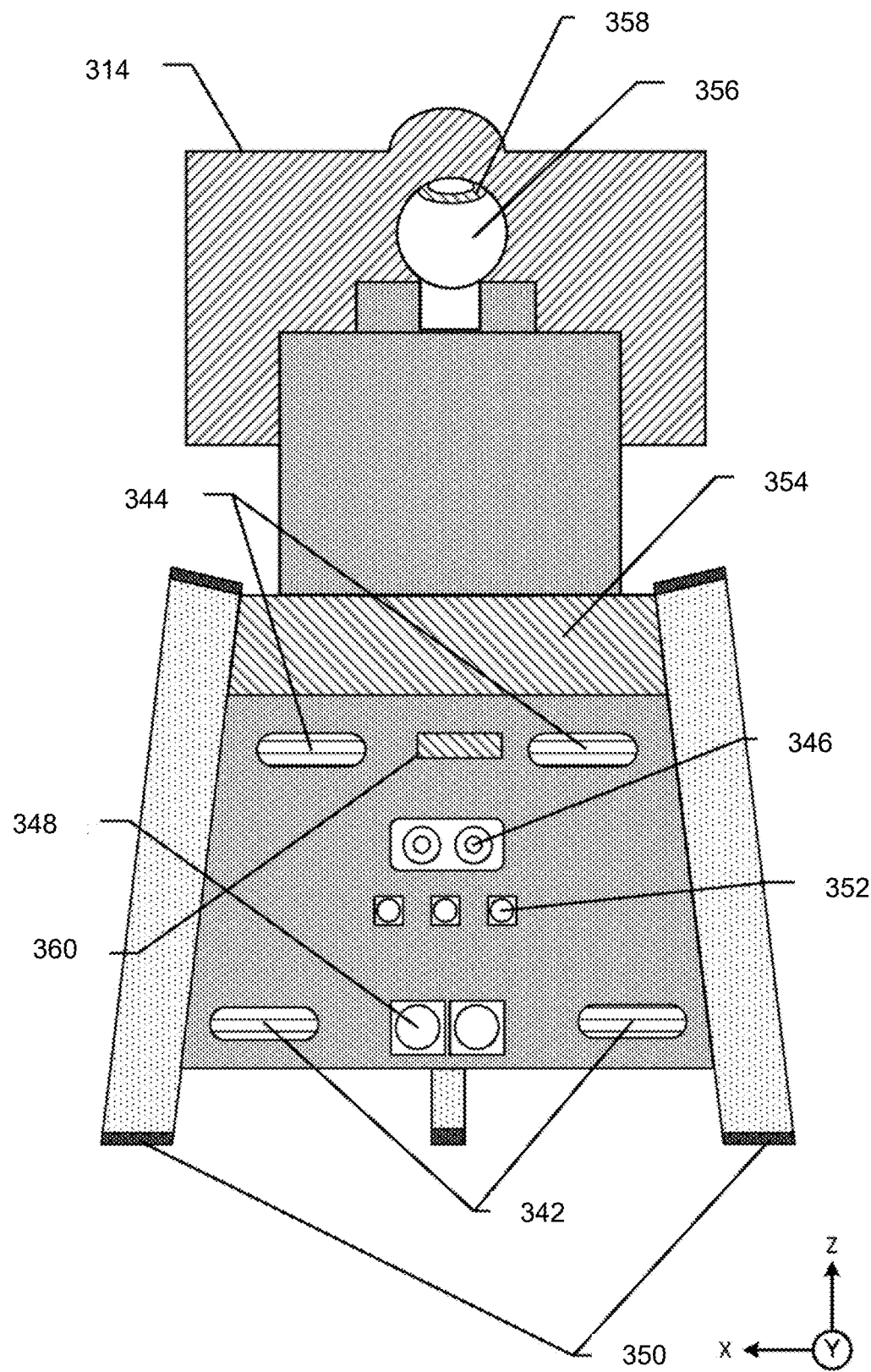

FIG. 3C illustrates a rear view of the device 110 according to various embodiments of the present disclosure. In this view, as with the front view, a first pair of optical sensors 342 may be located along the lower edge of the rear of the device 110, while a second pair of optical sensors 344 are located along an upper portion of the rear of the device 110. An ultrasonic sensor 346 may provide proximity detection for objects that are behind the device 110.

Charging contacts 348 may be provided on the rear of the device 110. The charging contacts 348 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 302 may include an electrically conductive portion 350 and provide an electrical conductive pathway between the device 110 and a charging source disposed on the floor. One or more data contacts 352 may be arranged along the back of the device 110. The data contacts 352 may be configured to establish contact with corresponding base data contacts within the docking station. The data contacts 352 may provide optical, electrical, or other connections suitable for the transfer of data.

Other output devices 360, such as one or more lights, may be disposed on an exterior of the back of the device 110. For example, a brake light may be arranged on the back surface of the device 110 to provide users an indication that the device 110 is slowing or stopping.

The device 110 may include a modular payload bay 354. In some embodiments, the modular payload bay 354 is located within the lower structure. The modular payload bay 354 may provide mechanical and/or electrical connectivity with the device 110. For example, the modular payload bay 354 may include one or more engagement features such as slots, cams, ridges, magnets, bolts, and so forth that are used to mechanically secure an accessory within the modular payload bay 354. In some embodiments, the modular payload bay 354 includes walls within which the accessory may sit. In other embodiments, the modular payload bay 354 may include other mechanical engagement features such as slots into which the accessory may be slid and engage. The device 110 may further include a mast 356, which may include a light 358.

Figure 3D:
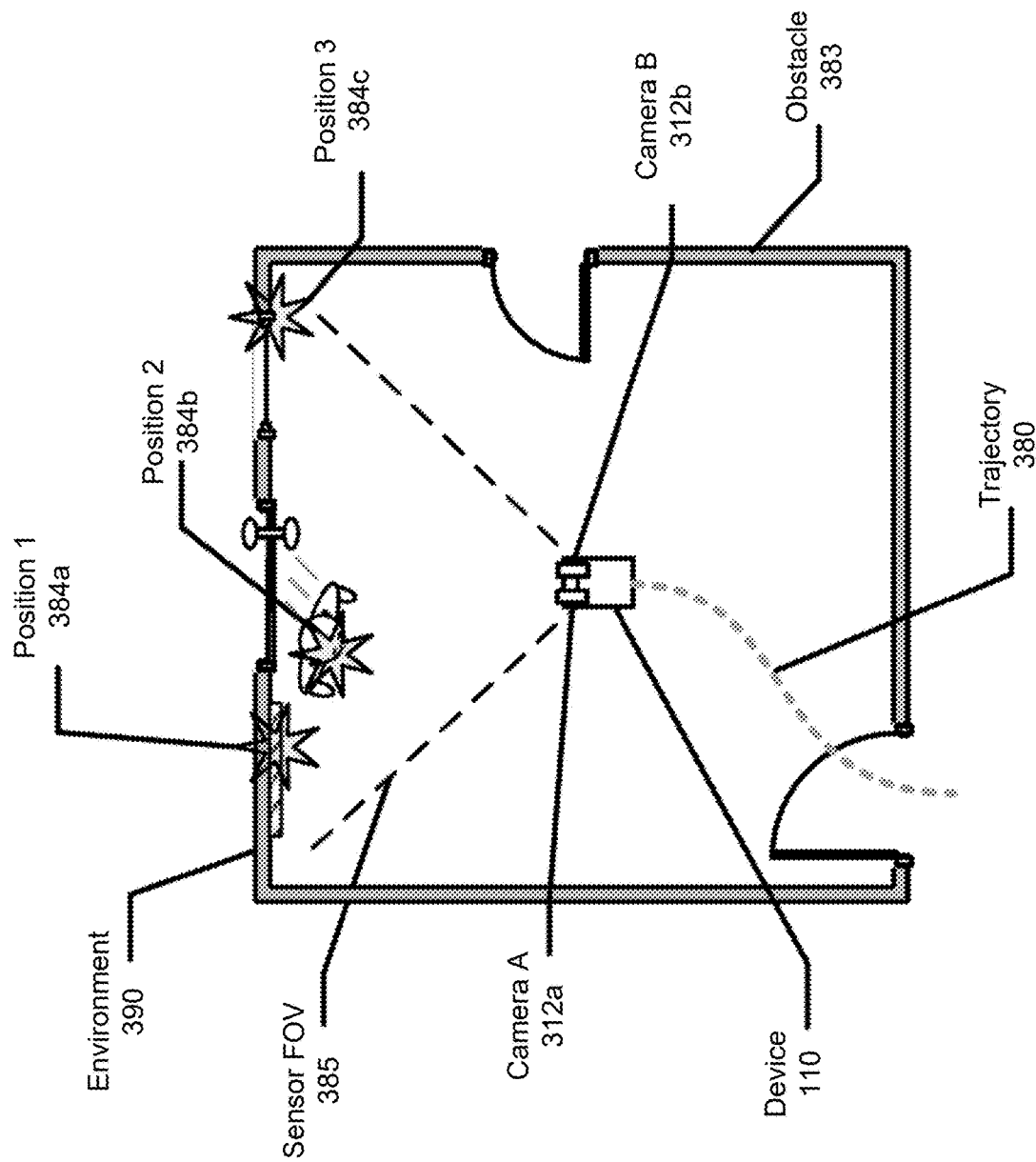
FIG. 3D illustrates a view of an autonomously motile device in an environment according to embodiments of the present disclosure.

FIG. 3D illustrates a view of a motile device in an environment according to embodiments of the present disclosure. As shown in FIG. 3D, the motile device 110 may move in the environment 390. The motion of the motile device 110 may be described as a trajectory 380, as shown in FIG. 3D. In some implementations, the trajectory 380 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

As described above, one or more motors or other actuators enable the motile device 110 to move from one location in the environment 390 to another. For example, a motor may be used to drive a wheel attached to a chassis of the motile device 110, which causes the motile device 110 to move. The motile device 110 may turn, move forward, move backward, and so forth. In another example, actuators may move legs allowing the motile device 110 to walk.

The motile device 110 may include one or more sensors. For example, the sensors may include a first camera 312a, a second camera 312b, an inertial measurement unit (IMU), microphones, time-of-flight (TOF) sensors, and so forth. The first camera 312a and the second camera 312b may be mounted to a common rigid structure that maintains a relative distance between the cameras 312a, 312b. An IMU may be attached to this common rigid structure, or one of the cameras affixed thereto. The first camera 312a and the second camera 312b may be arranged such that a sensor field-of-view 385 of the first camera 312a overlaps at least in part a sensor field-of-view of the second camera 312b.

Figure 3E:
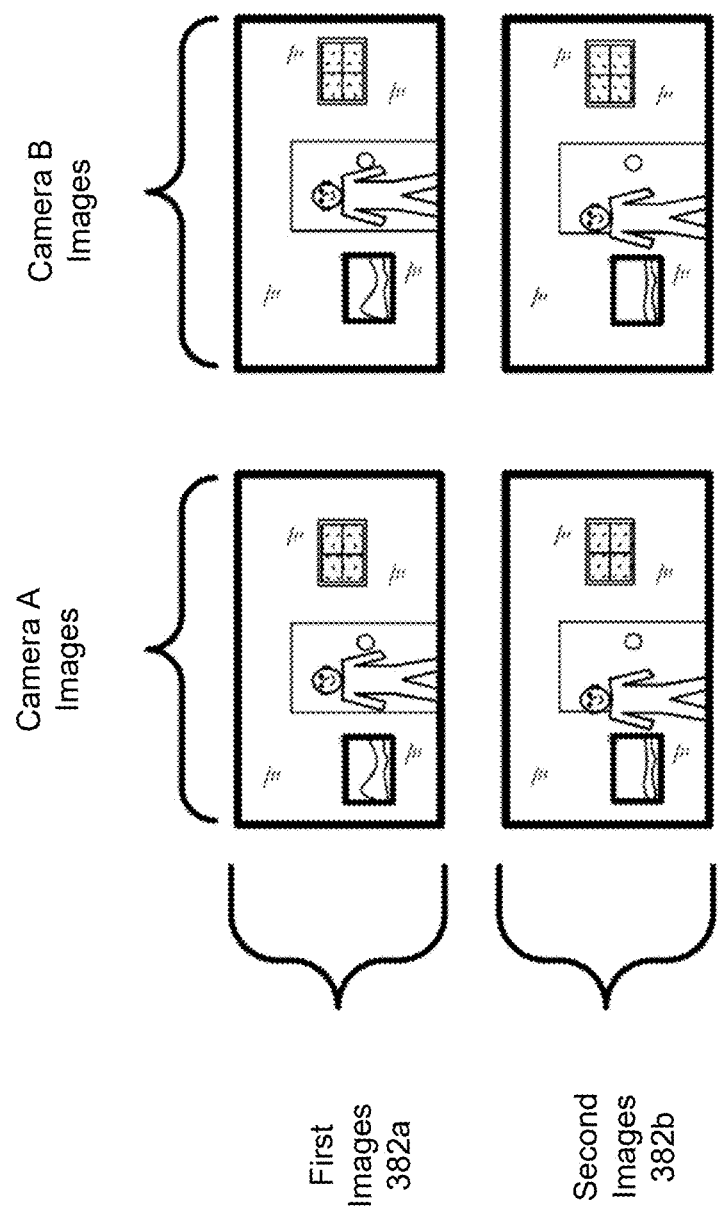

The sensors may generate sensor data (which may be stored in storage). The sensor data may include audio data acquired by one or more microphones and/or image data acquired by the first camera 312a and/or the second camera 312b. As illustrated in FIG. 3E, a pair of images 382 may comprise image data from the first camera 312a and the second camera 312b that are acquired at the same time. For example, a first pair of images 382a may be acquired at time t_1 and a second pair of images 382b may be acquired at time t_2. Some or all of the image data and/or audio data may be sent to the user device 110 for output thereon, although the disclosure is not limited thereto.

During operation the motile device 110 may determine input data. The input data may include or be based at least in part on sensor data from the sensors onboard the motile device 110. In one implementation, a speech processing component (which may include speech-processing component(s) illustrated in FIG. 2) may process raw audio data obtained by a microphone on the motile device 110 and produce input data. For example, the user may say "Echo, come here" which may produce input data "come here". In another implementation, the input data may comprise information such as a command provided by another computing device, such as a smartphone or tablet computer.

A mapping component may determine a representation of the environment 390 that includes the obstacles 383 and their location in the environment 390. During operation the mapping component uses the sensor data from various sensors to determine information such as where the motile device 110 is, how far the motile device 110 has moved, the presence of obstacles 383, where those obstacles 383 are, where a user is located (in conjunction with user recognition component 295), and so forth.

A feature module processes at least a portion of the image data to determine first feature data. The first feature data is indicative of one or more features 386 that are depicted in the image data. For example, as shown in FIG. 3F, the features 386 may be edges of doors, shadows on the wall, texture on the walls, portions of artwork in the environment 390, and so forth. The environment 390 may include display devices that are capable of changing the images they portray. For example, a television 388 may be presented in the environment 390. The picture presented by the television 388 may also have features 386.

Various techniques may be used to determine the presence of features 386 in image data. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 386 in the image data. A feature 386 that has been detected may have an associated descriptor that characterizes that feature 386. The descriptor may comprise a vector value in some implementations. For example, the descriptor may comprise data indicative of the feature with respect to 256 different dimensions.

The first feature data may comprise information such the descriptor for the feature 386, the images that the feature 386 was detected in, location in the image data of the feature 386, and so forth. For example, the first feature data may indicate that in a first image the feature 386 is centered at row 994, column 312 in the first image. These data and operations, along with those discussed below, may be used by the motile device 110, and/or other devices, to perform the operations described herein.

Figure 4A:
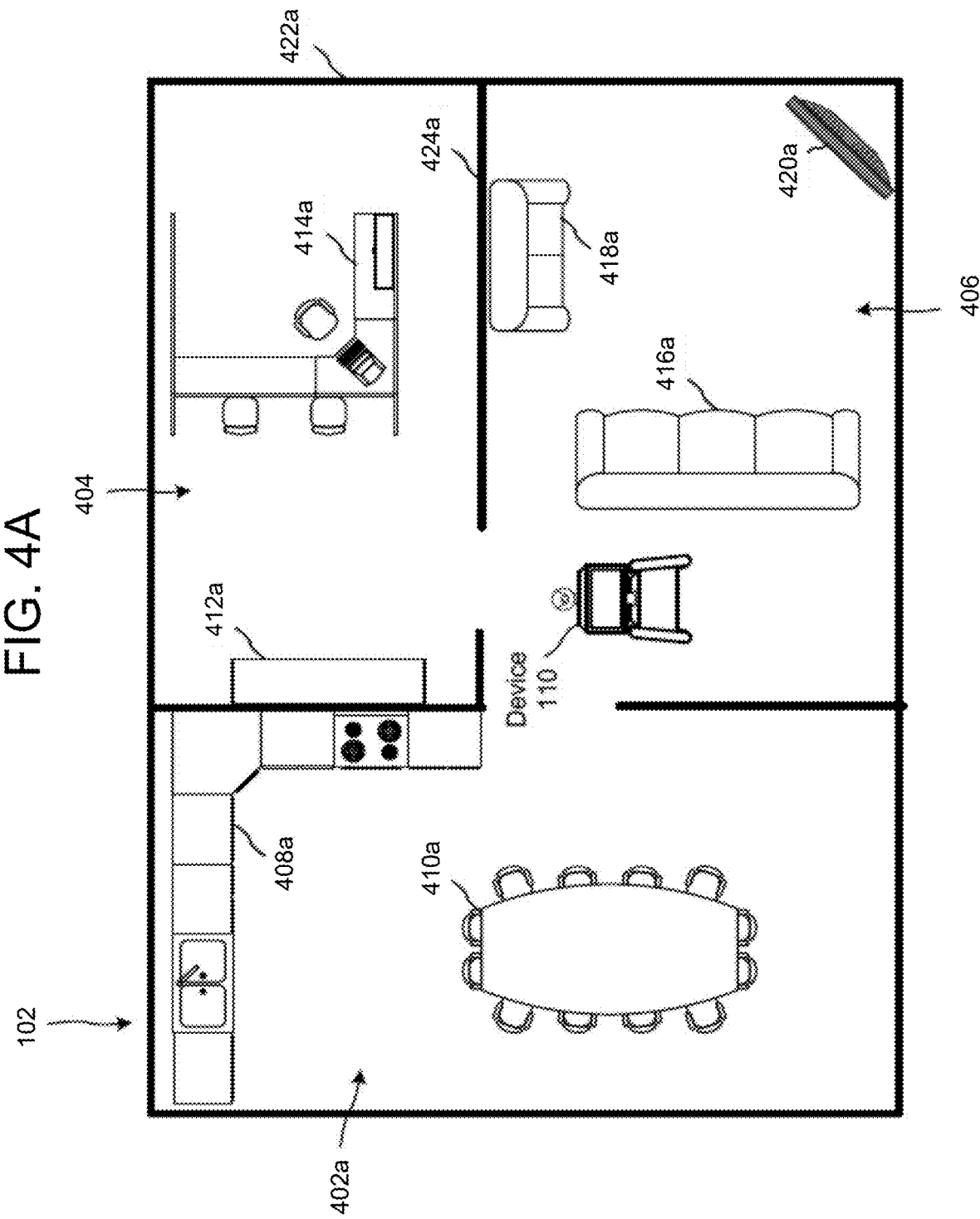
FIGS. 4A-4B illustrate an example of an environment and an occupancy map representing the environment according to embodiments of the present disclosure.
Figure 4B:
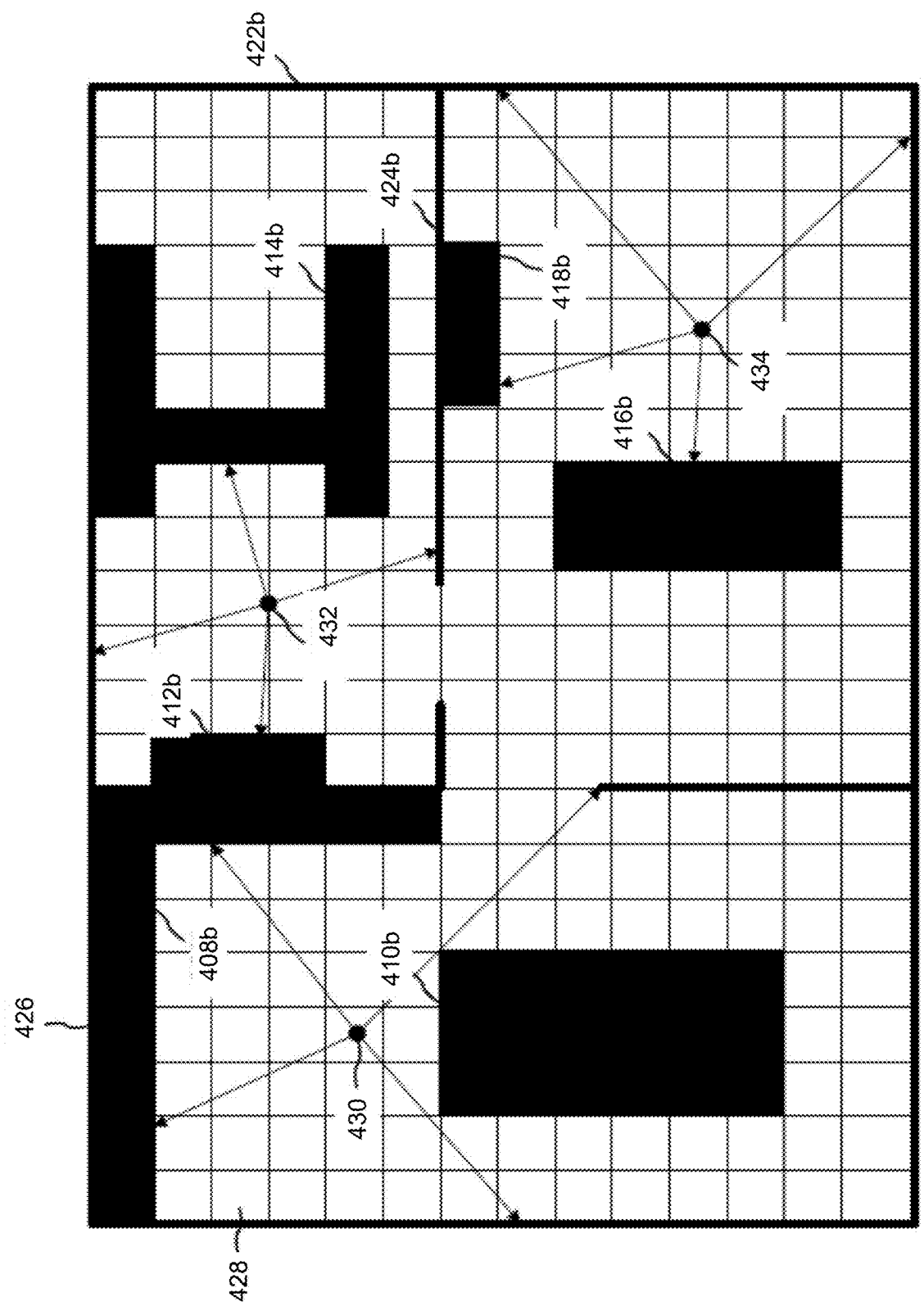

FIGS. 4A-4B illustrate an example of an environment 102 and an occupancy map representing the environment 102 according to embodiments of the present disclosure. The device 110 may be disposed at a location in the environment 102. The device 110 may have a certain orientation at the location and may have a certain arrangement of external components (e.g., mast height, display rotation, etc.); this orientation and arrangement may be collectively referred to as the pose of the device 110. Referring first to FIG. 4A, an example environment 102 includes three rooms 402, 404, 406. A first room 402 includes a kitchen countertop 408a and a table and chairs 410a. A second room 404a includes bookshelves 412a and a desk 414a. A third room 406a includes a sofa 416a, a loveseat 418a, and a wall-mounted television 420a. In this example environment 102, some objects (such as sofa 416a) extend from the floor of the environment 102 to a point between the ceiling and the floor; some objects (such as the television 420a) do not touch the floor; and other objects (such as bookshelves 412a) extend from floor to ceiling. The environment is bordered by exterior walls 422a and may include one or more interior walls 424a. The device 110 is capable of movement, as disclosed herein, within the environment 102. Environments 102, however, having any number of rooms and/or any types of objects are within the scope of the present disclosure.

FIG. 4B illustrates an occupancy map 426 of the environment 102. The device 110 may generate the occupancy map 426 or may receive the occupancy map 426 from the system 120. The occupancy map 426 includes data representing the position 422b of exterior walls 422a and data representing the position 424b of interior walls 424a. The occupancy map data may be a set of (x,y) coordinates that indicate the positions 422b, 424b of the walls 422a, 424a with respect to a (0,0) origin point, such as a bottom-left point of the map 426. For example, if an exterior wall 422a extends from the (0,0) origin point to a point 10 meters to the right, the occupancy map data may include the coordinates (0,0)-(10,0).

The occupancy map 426 may further include data representing the positions 408b, 410b, 412b, 414b, 416b, 418b of the objects 408a, 410a, 412a, 414a, 416a, 418a. The data representing the positions 408b, 410b, 412b, 414b, 416b, 418b may similarly be a set of further (x,y) coordinates that represent the position and size of each object 408a, 410a, 412a, 414a, 416a, 418a in the environment 102 with respect to the (0,0) origin point. For example, if the sofa 416 has dimensions of 1 meter by 0.5 meters, and if it is positioned such that its lower-left corner is disposed at the grid point (10,1), the data representing its position may be (10,1)×(10.5, 2), denoting its lower-left corner and upper-right corner. Objects having more complicated shapes (with more than four sides) may be represented by additional sets of (x,y) coordinates, such that each pair of (x,y) coordinates defines a side of the object. Objects having curved or otherwise more complicated sides may be represented by data defining the curve, such as parameters defining an arc segment, or may be estimated as a set of straight lines. Each cell may have an obstacle value representing whether that cell corresponds to an obstruction; the value may be 1 for an obstruction and 0 for no obstruction. In the real world, the obstacle value is representative of whether a particular location, area, etc. is navigable or not by the autonomous motile device. For example, if a particular cell in the occupancy map has an obstacle value of '1', then the area in the real world/physical space corresponding to that particular cell is likely not navigable as it might have some physical obstruction such a piece of furniture. The nature of the obstruction can be temporary, e.g., a human standing at a location, or long-term, e.g., a dining table. The device 110 may determine presence or absence of an obstruction in a cell or group of cells by using the obstacle value; if the obstacle value is '1,' the device 110 determines that the cell is no navigable.

In some examples, the device 110 and/or system 120 may determine the occupancy map 426 by processing input data, such as image data received from the camera 114 or infrared data received from one or more cameras 212. The device 110 may move within the environment 102 while it captures the image data. In some embodiments, device 110 and/or system 120 processes the image data using image-processing techniques to determine objects therein and then determines the position data based thereon. For example, if the device 110 captures image data that includes a representation of the sofa 416a, the device 110 and/or system 120 may determine, based on a likely size of the sofa 416a, how far the sofa 416 is from the device 110 and base the (x,y) coordinates of the representation of the sofa 416b thereon. In other embodiments, the device 110 and/or system 120 uses the multiple cameras 212 to capture binocular images of the environment 102 and, based on a known distance between the multiple cameras 212, determines the distance between the device 110 and an object depicted in the binocular images. Any method of determining the coordinates of the positions 422b, 424b of the walls 422a, 424a and the positions 408b, 410b, 412b, 414b, 416b, 418b of the objects 408a, 410a, 412a, 414a, 416a, 418a is within the scope of the present disclosure.

The map data may further include a grid made up of grid units 428. If the map data does not include the grid, the device 110 may create the grid. Each grid unit may have dimensions of any size, such as 100 centimeters length and width. The grid units need not be square and need not be all the same size; they may be, for example hexagonal. The system 120 and/or device 110 may create the grid by beginning at the (0,0) origin point and placing grid tiles adjacent in the positive x- and y-dimensions. In other embodiments, the system 120 and/or device 110 may determine the length and width of each grid unit by determining the length and width of the map 426 and/or rooms 402, 404, 406 and dividing by an integer, such as ten, so that no fractionally-sized grid units 428 are needed to fully populate the map 426 with the grid units 428.

The system 120 and/or device 110 may then determine one or more candidate locations in the occupancy map 426, such as the candidate locations 430, 432, 434 depicted in FIG. 4B. The candidate locations may be determined by determining a center point of each grid unit 428. The candidate locations may instead or in addition be at elsewhere in each grid unit 428 or on a border of each grid unit 428, such as a vertex of each grid unit 428. In some embodiments, the number of candidate locations is the same as the number of grid units 428; in other embodiments, the number of candidate locations differs from the number of grid units 428. There may be, for example, one candidate location for every two grid units 428 or two candidate locations per grid unit 428. In other embodiments, the candidate locations are determined without reference to any grid unit 428 and may be placed, for example, such that each candidate location is a predetermined distance from others, such as 1 meter. Parts of the map 426 that are not obstructed but that are unreachable by the device 110 may not be considered candidate locations. Furthermore, a user may indicate that no candidate locations should be placed in certain rooms (e.g., blacklisting one or more rooms) or that candidate locations should only be placed in certain rooms (e.g., whitelisting one or more rooms).

For each candidate location, the system 120 and/or device 110 may determine a viewable area corresponding to that candidate location. The viewable area may be an area of the occupancy map 426 that, were the device 110 positioned at the candidate location, is capable of being input as image data to the device 110. The viewable area may be found by rotating a line segment that is fixed at one end at the candidate location through 360 degrees around the candidate location; the other end of the line segment, as it rotates, terminates when it reaches an obstruction, such as a wall 422b or object 408. Any area of the map 426 (other than an obstruction) that the line segment intersects as it rotates may be the viewable area. In some embodiments, the line segment has a maximum length (e.g., five meters) to account for non-obstructed portions of the map 426 that are too far from the candidate location to be viewable (e.g., too far for the camera 114 to accurately resolve). With reference to FIG. 4B, the viewable area may be quantified by counting a number of grid units 428 that the line segment intersects as it rotates. In other embodiments, the viewable area may be quantified by determining the area (in, e.g., square meters) that the line segment intersects.

In some embodiments, the line segment rotates through 360 degrees. In other embodiments, the system 120 and/or device 110 rotates the line segment through some number of degrees less than 360 degrees, such as 180 degrees. The begin and endpoints of the rotation (e.g., the particular degrees that, with respect to the candidate location, at which the line segment begins and ends to rotate) may be determined randomly; a number of rotations, each with different begin and endpoints, may be performed at each candidate location, and the quantified viewable area may be determined by the rotation that yields the greatest viewable area. In other embodiments, the begin- and endpoints are determined such that the rotation is on the opposite side of the device 110 from a nearest wall or obstruction.

While not illustrated in FIG. 4B, in some examples the system 100 may generate multiple occupancy maps without departing from the disclosure. For example, the system 100 may generate the first map 426 at a first elevation in the environment 102 and generate a second map (not illustrated) at a second elevation that is different from the first elevation. For example, the first height of the first map 426 may be closer to the floor of the environment 102 (e.g., 500 centimeters above the floor), while the second height of the second map may be closer to the ceiling (e.g., two meters from the floor). Thus, the system 100 may generate occupancy maps at different elevations that may include different obstacles, although the disclosure is not limited thereto. Some objects below the height of the second map, such as sofa 416b, would appear in the first map 426 but not the second map. Other objects above the height of the first map 426, such as the wall-mounted television 420b, would appear in the second map but not the first map 426. Some tall objects, such as shelving 412b, 412c, may appear in both maps.

In some examples, the device 110 may be capable of changing a position of a moveable component. For example, the device 110 may have an extendable mast configured to support the camera 114 and/or other sensors. Thus, the device 110 may generate input data at different elevations based on how far the extendable mast is extended. However, the disclosure is not limited thereto and the device 110 may have a fixed position for one or more sensors without departing from the disclosure.

Figure 5:
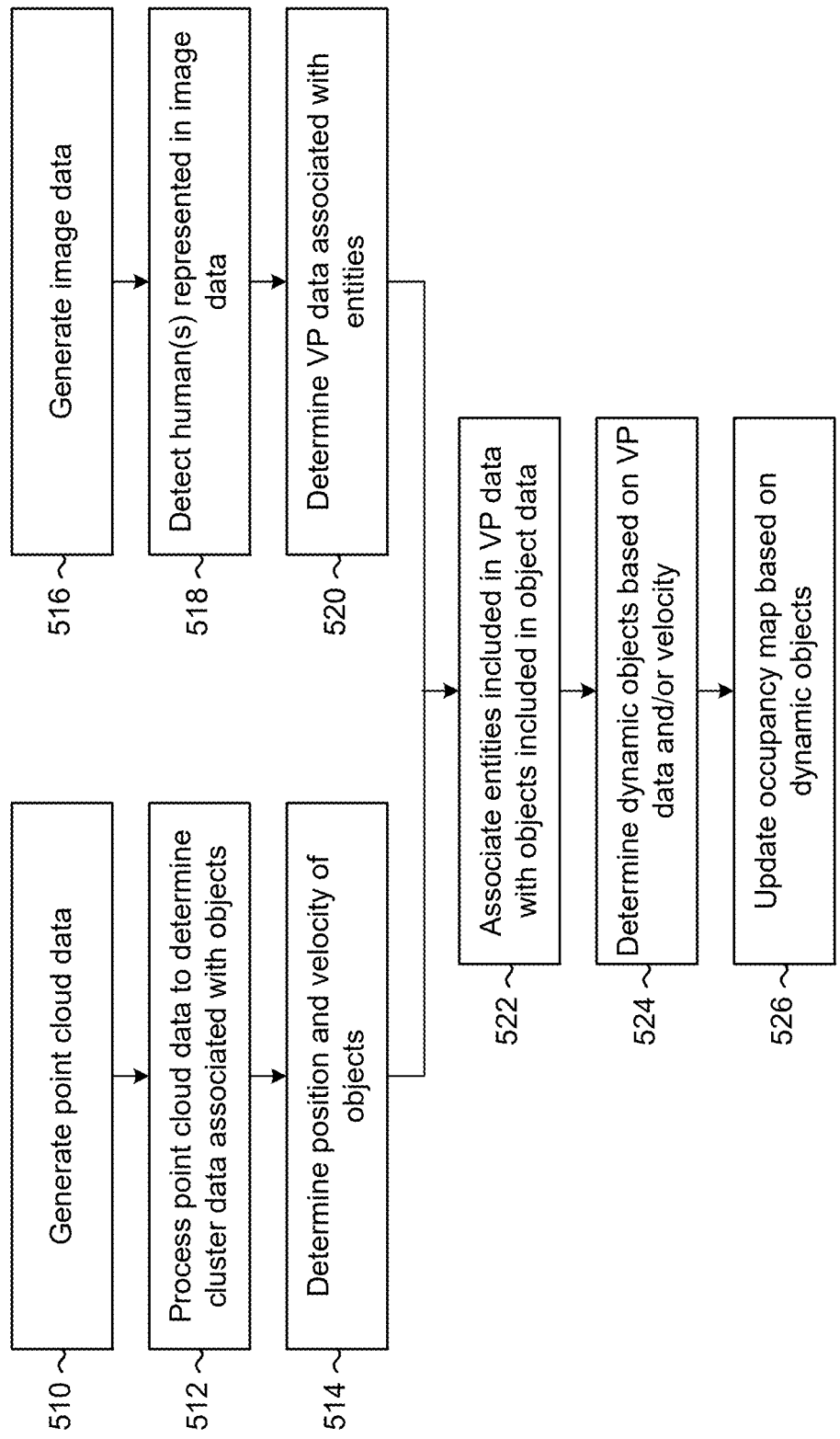
FIG. 5 is a flowchart conceptually illustrating an example method for determining dynamic objects and updating an occupancy map according to embodiments of the present disclosure.

FIG. 5 is a flowchart conceptually illustrating an example method for determining dynamic objects and updating an occupancy map according to embodiments of the present disclosure. As illustrated in FIG. 5, the device 110 may generate (510) point cloud data. For example, the device 110 may navigate within the environment 102 and capture the environment 102 using one or more sensors (e.g., lidar sensor, camera, depth sensor, and/or the like), as described in greater detail above. As part of capturing the environment 102, the device 110 may generate the point cloud data based on input scan data generated by the one or more sensors. For example, the device 110 may use the lidar sensor, the depth sensor, and/or the like to generate the point cloud data directly from input scans generated by the one or more sensors. However, the disclosure is not limited thereto, and in some examples the device 110 may capture image data using one or more cameras and generate the point cloud data based on the image data without departing from the disclosure.

The point cloud data may represent a plurality of target locations (e.g., potential obstacles or objects) detected by the one or more sensors. For example, the device 110 may process the input scan data to generate a point cloud representing the target locations of potential obstacles in the environment. In some examples, the point cloud data may indicate the target locations using absolute values. For example, the point cloud data may represent the target locations using two-dimensional (2D) or three-dimensional (3D) coordinates that indicate a specific location within the environment. However, the disclosure is not limited thereto, and in other examples the point cloud data may indicate the target locations using relative values. For example, the point cloud data may represent the target locations using distance measurements and/or angle measurements that indicate a relative position of the target location (e.g., relative to a location of the device 110 within the environment at the time that the measurement was generated) without departing from the disclosure. Thus, the point cloud data may correspond to raw input scans (e.g., relative positions) output by the one or more sensors or processed input scans (e.g., absolute position) generated by processing the raw input scans without departing from the disclosure.

Additionally or alternatively, the point cloud data may correspond to a grid map representing the target locations. Thus, in some examples the device 110 may generate a point cloud and may populate the point cloud in the grid map (e.g., cell grid) to generate the point cloud data, although the disclosure is not limited thereto. For example, the device 110 may represent a map of the environment using a grid having a plurality of grid units (which may also be referred to as cells). The grid may be two- or three-dimensional; each grid unit or cell may be, for example, one meter on each side, although the disclosure is not limited thereto. The device 110 may populate the grid map by representing each point in the point cloud at a location within the grid map that corresponds to the target location. Thus, the point cloud may correspond to target locations representing target surfaces (e.g., potential obstacles) in the environment detected while generating the input scan data. Multiple points of the point cloud may correspond to a single cell (e.g., grid unit), despite variations in the exact target location between the multiple points, without departing from the disclosure.

Referring back to FIG. 5, the device 110 may process (512) the point cloud data to determine cluster data associated with object(s) located in the environment. For example, the device 110 may identify one or more clusters of points represented in the point cloud data, with an individual cluster corresponding to an object in the environment. As part of processing the point cloud data, the device 110 may identify and ignore fixed obstacles in the environment, such as walls, furniture, and/or the like that are static over time. Thus, the device 110 may identify clusters of points that are not static in the environment, indicating that the cluster corresponds to an object that can move around the environment.

The cluster data may represent the clusters represented in the point cloud data using a variety of techniques without departing from the disclosure. In some examples, the cluster data may represent a first cluster using some or all of the points in the point cloud data that are associated with the first cluster without departing from the disclosure. However, the disclosure is not limited thereto and in other examples the cluster data may represent the first cluster using statistical data associated with the first cluster (e.g., a position of the first cluster along with a standard deviation, variance, and/or the like representing a distribution of the first cluster), using cells in a grid map that correspond to the first cluster, and/or the like without departing from the disclosure.

Using the cluster data, the device 110 may determine (514) a position and velocity for each of the object(s). For example, the device 110 may track the individual clusters represented in the cluster data over time, such that the device 110 may determine a first position and/or a first velocity for a first object during a first time range, a second position and/or a second velocity for the first object during a second time range, and so on. In some examples, the device 110 may input cluster data representing one or more clusters to a multi-object tracking component and the multi-object tracking component may generate object data indicating the position and/or velocity for each of the object(s), although the disclosure is not limited thereto.

While the example illustrated in FIG. 5 refers to the device 110 determining a velocity of the objects, the disclosure is not limited thereto and in some examples the device 110 may determine a speed of the objects without departing from the disclosure. Thus, the device 110 may determine a position and/or speed (e.g., rate of change of the position) for each of the objects, while not determining a directional component (e.g., a direction of motion) associated with the velocity, without departing from the disclosure.

To illustrate an example, the device 110 may navigate through the environment and generate the point cloud data using the one or more sensors as described above. The device 110 may then process the point cloud data to determine cluster data indicating multiple distinct clusters represented in the point cloud data. The device 110 may track these distinct clusters over time and determine that a first cluster corresponding to a first object is associated with a first position and a first velocity or speed at a first time, that a second cluster corresponding to a second object is associated with a second position and a second velocity or speed at the first time, and so on. In some examples, the device 110 may generate object data representing the position(s) and/or speed(s) associated with one or more objects present in the environment, although the disclosure is not limited thereto.

The device 110 may generate (516) image data using one or more cameras and may detect (518) human(s) represented in the image data. For example, the device 110 may generate image data in one or more directions using the one or more cameras while navigating around the environment. In some examples, the device 110 may use computer vision processing to detect one or more humans represented in the image data. For example, the device 110 may process the image data by performing object detection processing, object recognition processing, pose estimation processing, and/or the like, although the disclosure is not limited thereto and the device 110 may detect the human(s) using other techniques without departing from the disclosure.

The device 110 may determine (520) visual perception (VP) data associated with entities present in the environment. For example, the device 110 may track each human detected in the image data as an individual entity and may generate VP data corresponding to each of the entities. In some examples, the device 110 may process the image data representing the human(s) and generate VP data that includes descriptive information associated with an entity during a period of time. For example, the VP data may include a current location of the entity, a posture classification indicating a current posture associated with the person detected in the image data, an identity of the entity (e.g., user profile, identification, and/or the like associated with the person detected in the image data), and/or the like, although the disclosure is not limited thereto and the VP data may include additional information without departing from the disclosure.

While FIG. 5 illustrates an example in which the device 110 detects human(s) represented in the image data and determines VP data indicating a posture associated with the human(s), such that the entities included in the VP data only correspond to humans, the disclosure is not limited thereto. In some examples, the device 110 may detect other types of entities (e.g., objects, pets, animals, and/or the like) and determine VP data indicating a posture and/or other features associated with the entity without departing from the disclosure. For example, the entities included in the VP data may correspond to humans, animals, and/or the like, although the disclosure is not limited thereto.

To illustrate a simple example, the device 110 may generate VP data that includes the current location of an entity along with a posture classification that indicates a current posture associated with the entity. In some examples, the device 110 may distinguish between a first posture classification (e.g., moving/standing) and a second posture classification (e.g., sitting/lying) without departing from the disclosure. For example, the first posture classification may correspond to a person that is temporarily occupying an otherwise unoccupied location in the environment (e.g., cell(s), cell grid(s), grid unit(s), etc. in the grid map that are not associated with a fixed obstacle such as a stationary object, furniture, a wall, and/or the like), such as when a person is moving through the environment and/or standing in open space. In contrast, the second posture classification may correspond to a person that is occupying an otherwise occupied location in the environment (e.g., cell(s), cell grid(s), grid unit(s), etc. in the grid map that are associated with a fixed obstacle such as a stationary object, furniture, and/or the like), such as when a person is sitting or lying on furniture or other objects.

FIGS. 6A-6B illustrate examples of removing dynamic objects from occupancy maps according to embodiments of the present disclosure. As illustrated in FIG. 6A, during dynamic object removal 600, the device 110 may distinguish between the first posture classification and the second posture classification to determine whether to classify an entity as a dynamic object and remove the entity from an occupancy map 610 of the environment. For example, when a first entity 612 (e.g., first person) associated with the first posture classification moves from a first location, the first location becomes unoccupied (e.g., free or open) and the device 110 may navigate unimpeded through the first location. Thus, the device 110 may remove the first entity 612 from the occupancy map 610 as the first entity 612 is a dynamic object capable of movement and there are no other obstacles at the first location.

In contrast, when a second entity 614 (e.g., second person) associated with the second posture classification moves from a second location, furniture or other objects remain at the second location, leaving obstacle(s) that prevent the device 110 from successfully navigating through the second location. If the device 110 classified the second entity 614 as a dynamic object, the device 110 would remove the furniture on which the second entity 614 is sitting or lying from the occupancy map 610 when the second entity 614 moved from the second location. Thus, the device 110 should not classify the second entity 614 as a dynamic object in order to avoid errantly removing the furniture from the occupancy map 610.

As illustrated in FIG. 6B, a raw occupancy map 620 illustrates an example in which the first entity 612 is at a first location (e.g., "1") in an open part of the room while the second entity 614 is at a second location (e.g., "2") on a couch. If the device 110 left both the first entity 612 and the second entity 614, the raw occupancy map 620 would show the first location as occupied when it is actually an open part of the room. However, if the device 110 removes both the first entity 612 and the second entity 614 from the raw occupancy map 620, the device 110 would be removing a portion of the couch from the raw occupancy map 620 by mistake, indicating that a portion of the couch is unoccupied. By incorporating the posture data and classifying dynamic objects based on the posture data, the device 110 may selectively remove the first entity 612 while leaving the second entity 614, as illustrated in final occupancy map 630.

While FIG. 6B illustrates an example of the raw occupancy map 620, this is intended to conceptually illustrate the improvement caused by performing dynamic object detection. However, this is not intended as an interim step, and the device 110 may generate the final occupancy map 630 without first generating the raw occupancy map 620 without departing from the disclosure.

While the simple example described above illustrates an example in which the device 110 may distinguish between two posture classifications, the disclosure is not limited thereto and the number of posture classifications may vary without departing from the disclosure. For example, the device 110 may distinguish between a first posture classification (e.g., moving), a second posture classification (e.g., standing), a third posture classification (e.g., sitting), a fourth posture classification (e.g., lying), and/or additional postures classification (e.g., squatting, running, etc.) without departing from the disclosure. Additionally or alternatively, the VP data may include additional information about the current posture without departing from the disclosure.

To improve performance of the device 110 and/or an accuracy of the occupancy map, the device 110 may combine the VP data, which provides detailed posture information, with the object data, which provides accurate tracking information (e.g., precise locations). The device 110 may use the VP data to classify an object represented in the object data as a dynamic object (e.g., mobile object) based on the posture of the entity.

As illustrated in FIG. 5, the device 110 may associate (522) entities included in the VP data with objects included in the object data. For example, the device 110 may determine that a first location corresponding to a first entity is in proximity to a second location corresponding to a first object, indicating that the first entity corresponds to the first object. However, the disclosure is not limited thereto, and the device 110 may use additional techniques to associate entities with objects without departing from the disclosure. In some examples, the device 110 may generate similarity scores, with a first similarity score indicating a similarity between the first entity and the first object. For example, the first similarity score may correspond to a distance value between the first location and the second location, such that the smaller the distance value, the higher the similarity score. Additionally or alternatively, the first similarity score may correspond to other features, such as size, appearance, and/or the like without departing from the disclosure.

In some examples, the device 110 may associate entities included in the VP data with objects included in the object data using a 1:1 correspondence, such that each entity included in the VP data is only associated with a single object included in the object data (e.g., some objects may not be associated with any entities). For example, the device 110 may use a linear assignment function to identify the closest and/or likeliest object to associate with the first entity. However, the disclosure is not limited thereto, and in other examples the device 110 may not use a 1:1 correspondence, such that each entity included in the VP data may be associated with multiple objects in the object data without departing from the disclosure. For example, the device 110 may determine a first similarity score indicating a similarity between the first entity and the first object, a second similarity score indicating a similarity between the first entity and a second object, and so on. Thus, while the device 110 may identify the highest similarity score for the first entity, the device 110 may calculate similarity scores for each of the objects included in the object data without departing from the disclosure.

Figure 7:
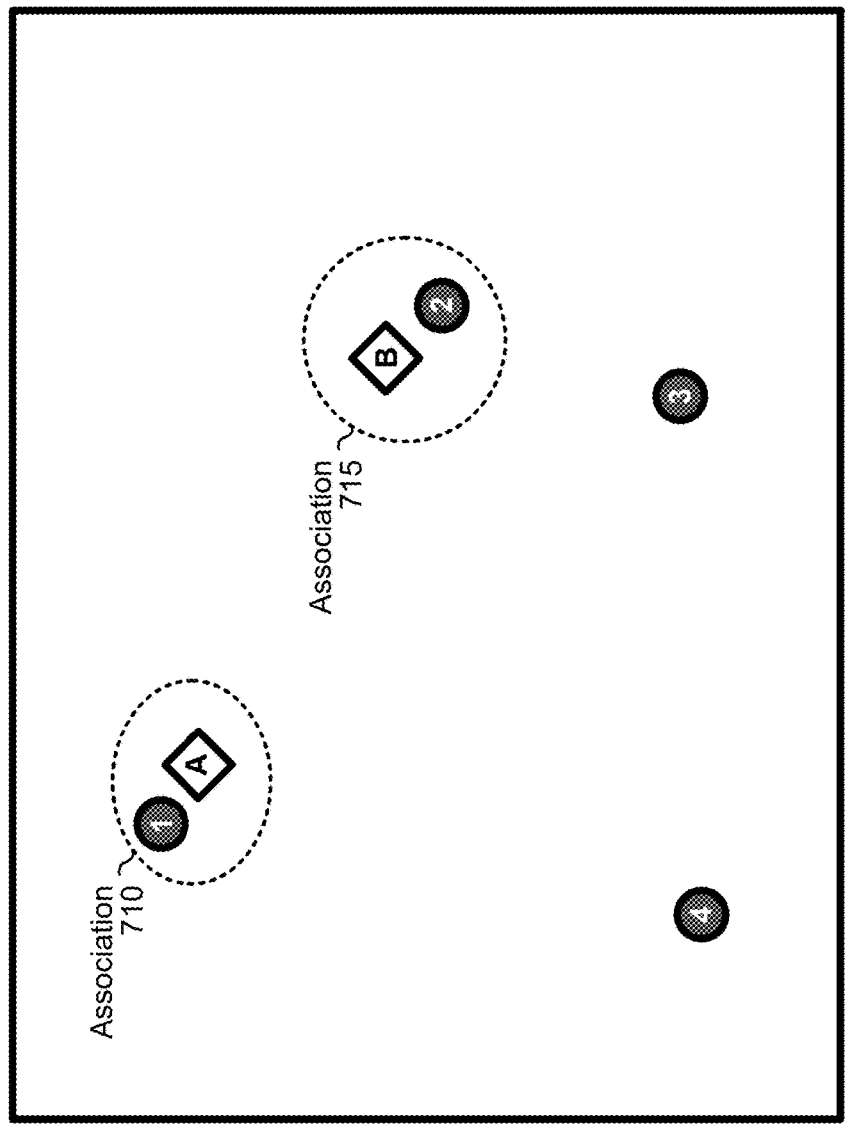
FIG. 7 illustrates an example of associating objects represented in point cloud data with entities detected using image data according to embodiments of the present disclosure.

FIG. 7 illustrates an example of associating objects represented in point cloud data with entities detected using image data according to embodiments of the present disclosure. As illustrated in FIG. 7, the device 110 may use spatial association to form an association between an individual entity represented in the VP data and an individual object represented in the point cloud data. For example, spatial association 700 illustrates an example in which the device 110 may determine that a first object (e.g., a first cluster represented in the point cloud data, illustrated as a first dark circle labeled "1") is near to (e.g., physically proximate) a first entity (e.g., a first person represented in the VP data, illustrated as a white diamond labeled "A") and may form a first association 710. Thus, the device 110 determines that the first object and the first entity are aligned, such that both correspond to the first person.

Similarly, the device 110 may determine that a second object (e.g., a second cluster represented in the point cloud data, illustrated as a second dark circle labeled "2") is near to (e.g., physically proximate) a second entity (e.g., a second person represented in the VP data, illustrated as a white diamond labeled "B") and may form a second association 715. Thus, the device 110 determines that the second object and the second entity are aligned, such that both correspond to the second person. In contrast, the device 110 may determine that there are no entities associated with a third object (e.g., a third cluster represented in the point cloud data, illustrated as a third dark circle labeled "3") or a fourth object (e.g., a fourth cluster represented in the point cloud data, illustrated as a fourth dark circle labeled "4").

The device 110 may form the first association 710 by comparing a first location associated with the first object with a second location associated with the first entity. For example, the device 110 may determine a distance between the first location and the second location and may determine that the distance is below a threshold value. Additionally or alternatively, the device 110 may determine that the first object is the closest object to the second entity out of all of the objects. For example, the device 110 may determine a first distance between the second location and the first location, determine a second distance between the second location and a third location associated with the second object, determine a third distance between the second location and a fourth location associated with the third object, determine a fourth distance between the second location and a fifth location associated with the fourth object, and then determine that the first distance is the smallest value, indicating a shortest distance between an object and the first entity.

Referring back to FIG. 5, the device 110 may determine (524) dynamic objects based on the VP data and/or velocity and may update (528) the occupancy map to remove the dynamic objects. Examples of classifying objects as dynamic objects are shown below with regard to FIGS. 8-9.

Figure 8:
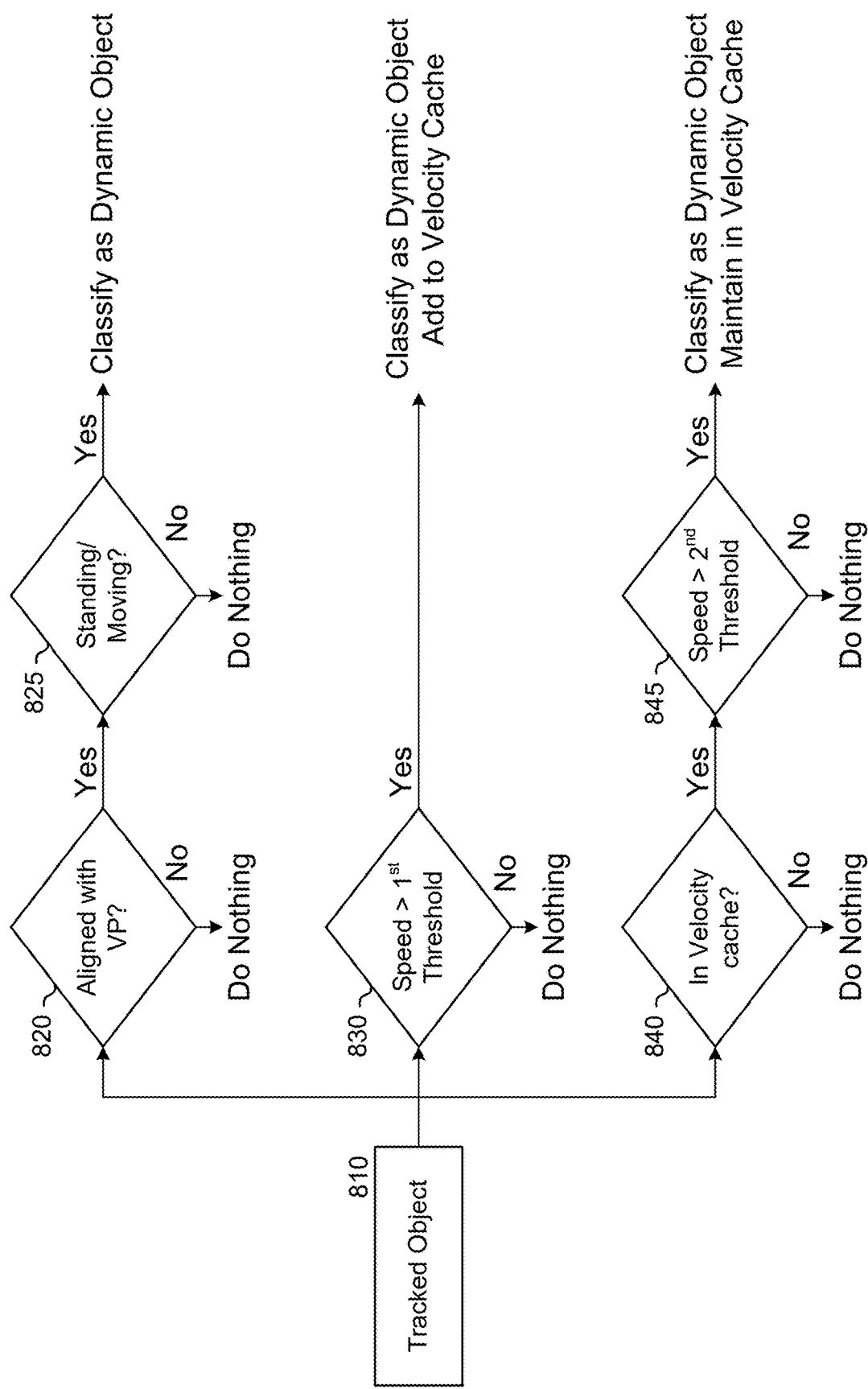
FIG. 8 is a decision tree illustrating a conceptual example of determining whether to classify an object as a dynamic object according to embodiments of the present disclosure.

FIG. 8 is a decision tree illustrating a conceptual example of determining whether to classify an object as a dynamic object according to embodiments of the present disclosure. As illustrated in FIG. 8, the device 110 may detect (810) a tracked object and may use a decision tree to determine whether to classify the tracked object as a dynamic object.

In a first branch of the decision tree, the device 110 may determine (820) whether the tracked object is aligned with an entity included in the VP data. For example, the device 110 may compare the tracked object to the entities represented in the VP data and determine whether there is an association between the tracked object and an entity, as illustrated in FIG. 7. If the tracked object is not aligned with an entity, the device 110 does nothing in the first branch of the decision tree.

If the tracked object is aligned with an entity, the device 110 may determine (825) whether the posture classification corresponds to a first posture (e.g., standing or moving). If the posture classification does not corresponds to the first posture, the device 110 does nothing in the first branch of the decision tree. If the posture classification does correspond to the first posture, the device 110 may classify the tracked object as a dynamic object.

In a second branch of the decision tree, the device 110 may determine (830) whether a speed value (e.g., speed component of a velocity) associated with the tracked object exceeds a first threshold value (e.g., 0.5 m/s, although the disclosure is not limited thereto). If the speed value does not exceed the first threshold value, the device 110 does nothing in the second branch of the decision tree. However, if the speed value exceeds the first threshold value, the device 110 may classify the tracked object as a dynamic object and add the tracked object to a velocity cache.

The velocity cache identifies tracked objects that exceeded the first threshold value within a period of time. For example, the velocity cache may store an identifier indicating that a tracked object exceeded the first threshold value within the past N frames. If the tracked object exceeded the first threshold value, the device 110 previously classified the tracked object as a dynamic object and there is a high likelihood that the tracked object should be removed from the obstacle map. By tracking tracked objects that exceeded the first threshold value, the device 110 may continue classifying these objects as dynamic objects even if a current speed value falls below the first threshold value. For example, the device 110 may compare a current speed value to a second threshold value (e.g., 0.2 m/s, although the disclosure is not limited thereto) that is lower than the first threshold value, maintaining the tracked object in the velocity cache as long as movement is detected by the device 110. If the current speed value of the tracked object falls below the second threshold value for the period of time, the device 110 may remove the tracked object from the velocity cache until the current speed value exceeds the first threshold value again.

As illustrated in FIG. 8, in a third branch of the decision tree the device 110 may determine (840) whether the tracked object is stored in the velocity cache. If the tracked object is not stored in the velocity cache, the device 110 does nothing in the third branch of the decision tree. If the tracked object is stored in the velocity cache, the device 110 may determine (845) whether a current speed value of the tracked object exceeds the second threshold value. If the current speed value does not exceed the second threshold value, the device 110 does nothing in the third branch of the decision tree. However, if the current speed value exceeds the second threshold value, the device 110 may classify the tracked object as a dynamic object and maintain the tracked object in the velocity cache.

FIG. 9 is a decision tree illustrating a conceptual example of determining whether to classify an object as a dynamic object according to embodiments of the present disclosure. The decision tree illustrated in FIG. 9 includes the three branches illustrated in FIG. 8, with more decisions included in the first branch and an additional fourth branch directed to a VP cache. As some of the decision blocks were described previously with regard to FIG. 8, a redundant description is omitted.

As illustrated in FIG. 9, in some examples the device 110 may add additional complexity to the first branch of the decision tree. For example, if the device 110 determines that the tracked object is aligned with the VP data (e.g., the tracked object is associated with an entity included in the VP data), the device 110 may determine (930) whether a current speed value of the tracked object exceeds the second threshold value. If the current speed value does not exceed the second threshold value, the device 110 does nothing in the first branch of the decision tree. However, if the current speed value exceeds the second threshold value, the device 110 may classify the tracked object as a dynamic object. Thus, the device 110 may continue classifying the tracked object as a dynamic object using the lower threshold value when the tracked object is associated with an entity in the VP data.

In addition, if the device 110 determines that the tracked object is aligned with the VP data, the device 110 may add the tracked object to a VP cache that operates similarly to the velocity cache described above. For example, the VP cache may include identifiers indicating tracked objects that were associated with entities included in the VP data within a period of time. Thus, the device 110 may maintain a short-term history of tracked objects that are aligned with the VP data, enabling the device 110 to use the second threshold value even when the tracked object is not currently aligned with the VP data. For example, the device 110 may only update the VP data periodically and the VP cache may maintain the association between tracked objects and entities even when the VP data is not being updated. To illustrate an example, the device 110 may only track a single entity per frame, such that one entity can be tracked every frame, two entities can be tracked every other frame, three entities can be tracked every third frame, and so on.

As illustrated in FIG. 9, in a fourth branch of the decision tree the device 110 may determine (910) whether the tracked object is included in the VP cache. If the tracked object is not stored in the VP cache, the device 110 does nothing in the fourth branch of the decision tree. If the tracked object is stored in the VP cache, the device 110 may determine (915) whether a current speed value of the tracked object exceeds the second threshold value. If the current speed value does not exceed the second threshold value, the device 110 does nothing in the fourth branch of the decision tree. However, if the current speed value exceeds the second threshold value, the device 110 may classify the tracked object as a dynamic object and maintain the tracked object in the VP cache.

Figure 10A:
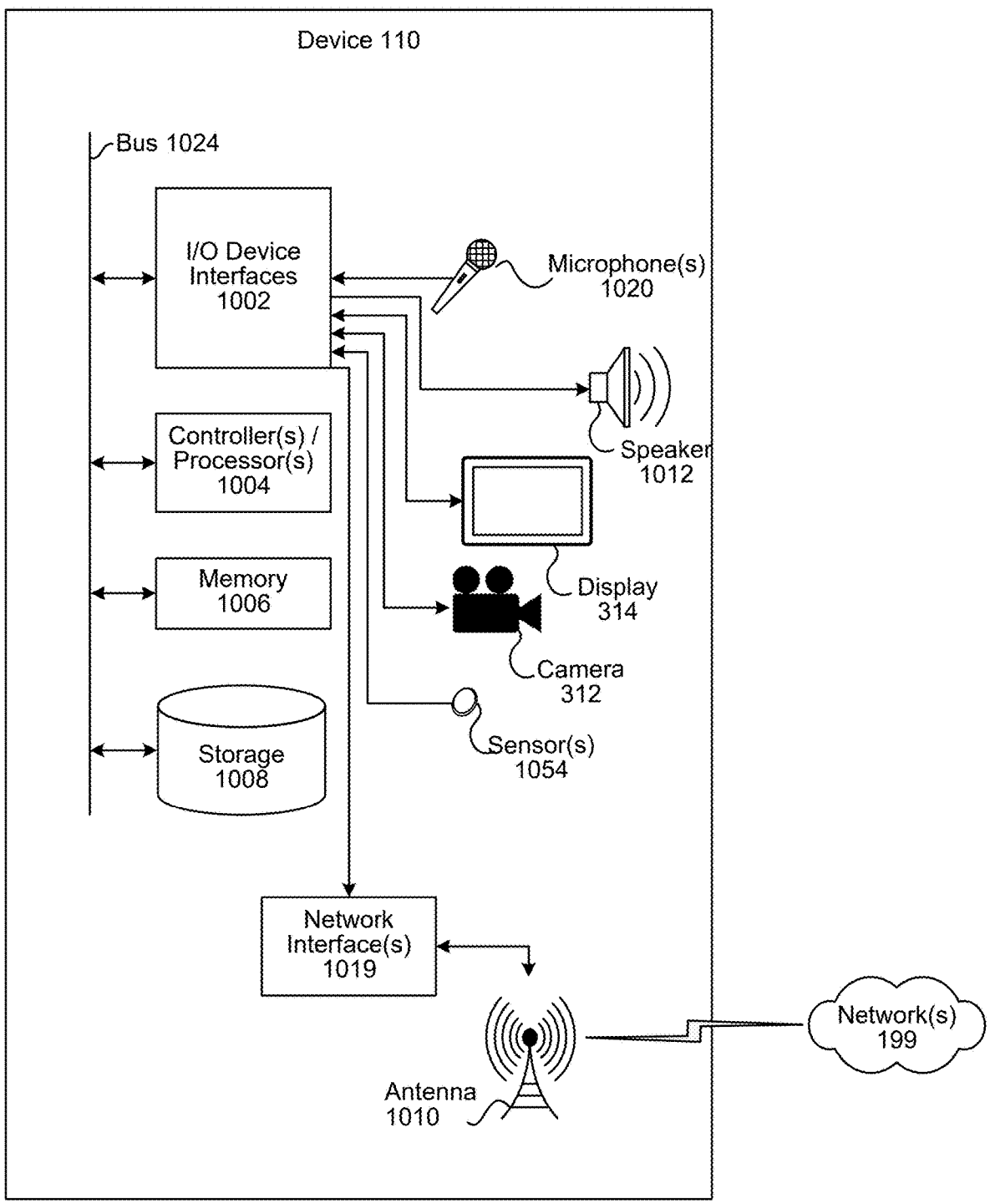
FIG. 10A is a block diagram conceptually illustrating example components of an autonomously motile device according to embodiments of the present disclosure.
Figure 11:
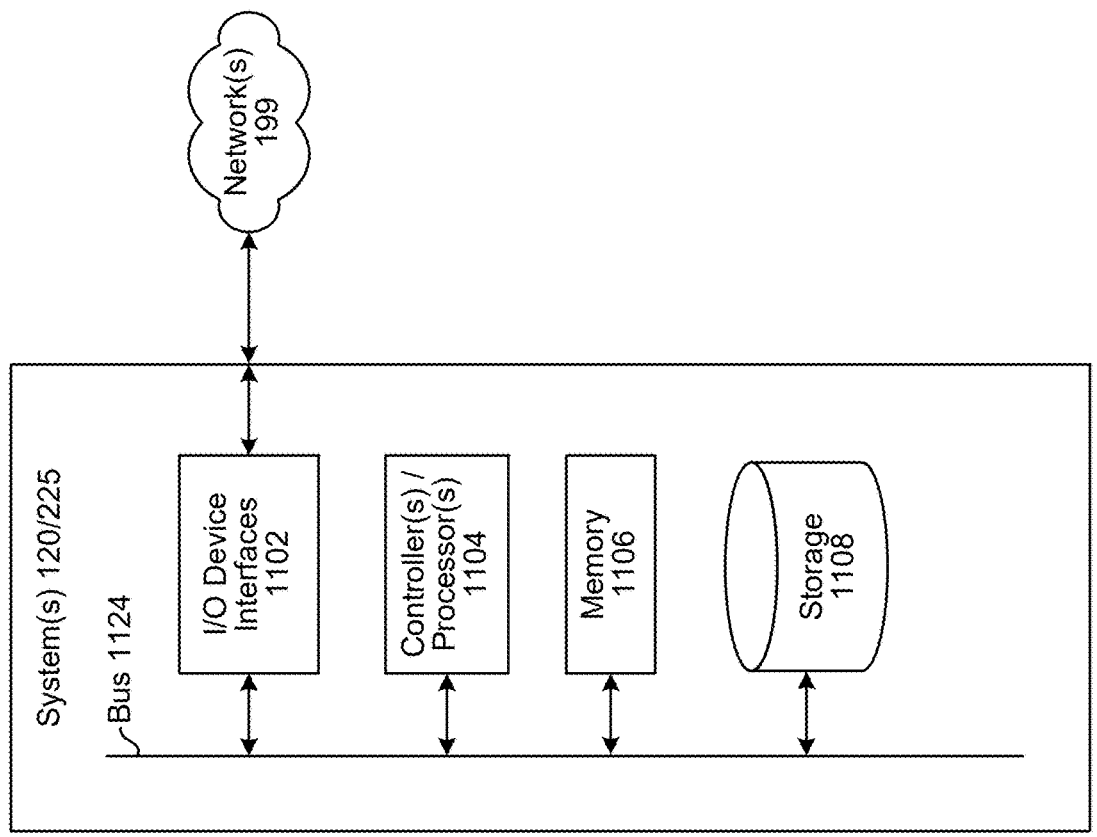
FIG. 11 is a block diagram conceptually illustrating example components of a server according to embodiments of the present disclosure.

FIG. 10A is a block diagram conceptually illustrating a device 110 that may be used with the system. FIG. 11 is a block diagram conceptually illustrating example components of a remote device, such as the system(s) 120, which may assist with creating a map of an environment 390, ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/225) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1002/1102).

Computer instructions for operating each device (110/120/225) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/225) includes input/output device interfaces (1002/1102). A variety of components may be connected through the input/output device interfaces (1002/1102), as will be discussed further below. Additionally, each device (110/120/225) may include an address/data bus (1024/1124) for conveying data among components of the respective device. Each component within a device (110/120/225) may also be directly connected to other components in addition to (or instead of) being connected to other components across the bus (1024/1124).

FIG. 10A is a block diagram of some components of the device 110 such as network interfaces 1019, sensors 1054, and output devices, according to some implementations. The components illustrated here are provided by way of illustration and not necessarily as a limitation. For example, the device 110 may utilize a subset of the particular network interfaces 1019, output devices, or sensors 1054 depicted here, or may utilize components not pictured. One or more of the sensors 1054, output devices, or a combination thereof may be included on a moveable component that may be panned, tilted, rotated, or any combination thereof with respect to a chassis of the device 110.

The device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset, etc. If an array of microphones is included, approximate distance to a sound's point of origin may be determined by acoustic localization based on time and amplitude differences between sounds captured by different microphones of the array. The device 110 may additionally include a display 314 for displaying content. The device 110 may further include a camera 312, light, button, actuator, and/or sensor 1054.

The network interfaces 1019 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the device 110 and other devices in the event that communication fails using one or more of the WLAN interface or the PAN interface. For example, in the event the device 110 travels to an area within the environment 390 that does not have Wi-Fi coverage, the device 110 may use the secondary RF link interface to communicate with another device such as a specialized access point, docking station, or other device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1002/1102) may also include and/or communicate with communication components (such as network interface(s) 1019) that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1002/1102), processor(s) (1004/1104), memory (1006/1106), and/or storage (1008/1108) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 10B:
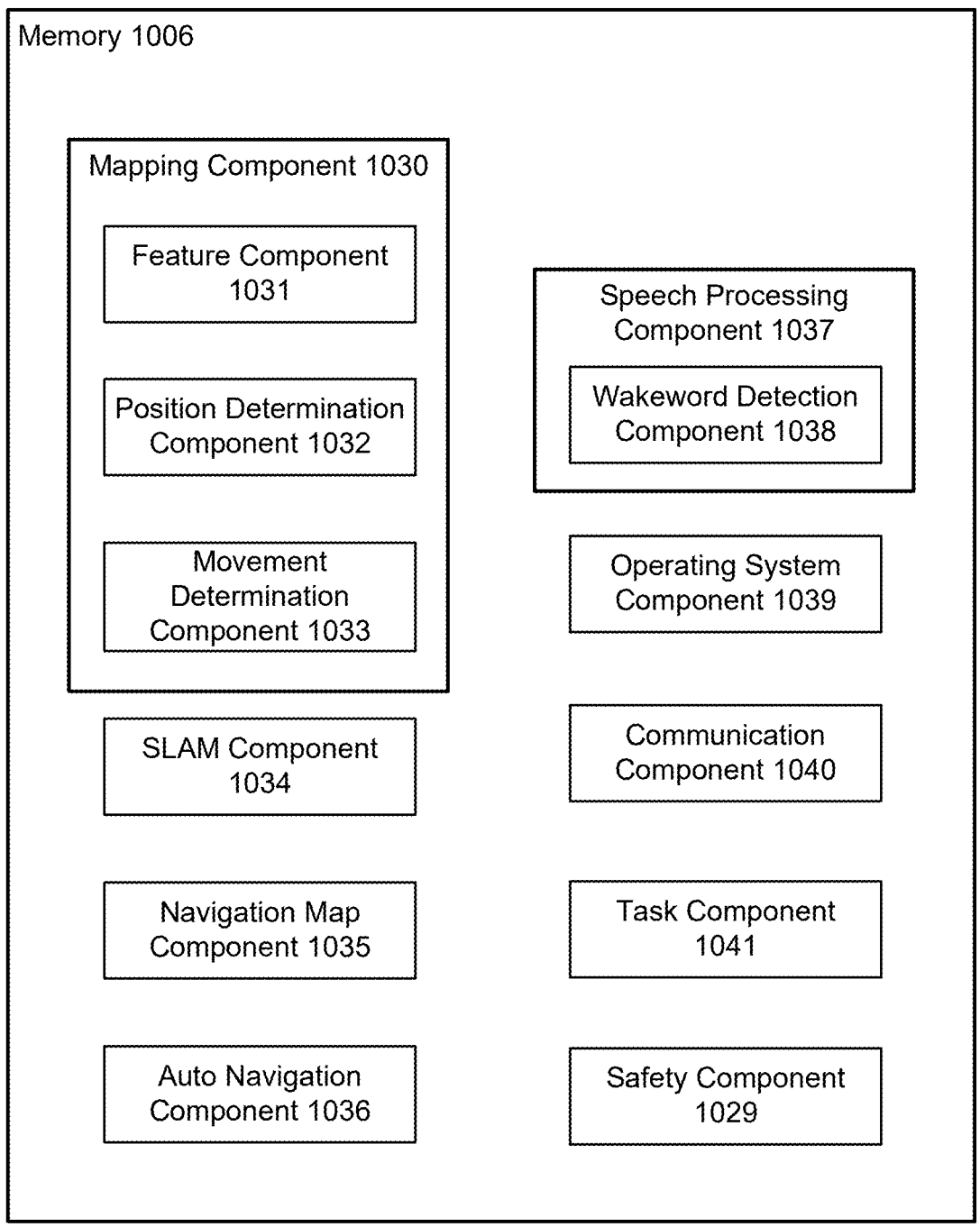
FIG. 10B illustrates components that may be stored in a memory of an autonomously motile device according to embodiments of the present disclosure.
Figure 10C:
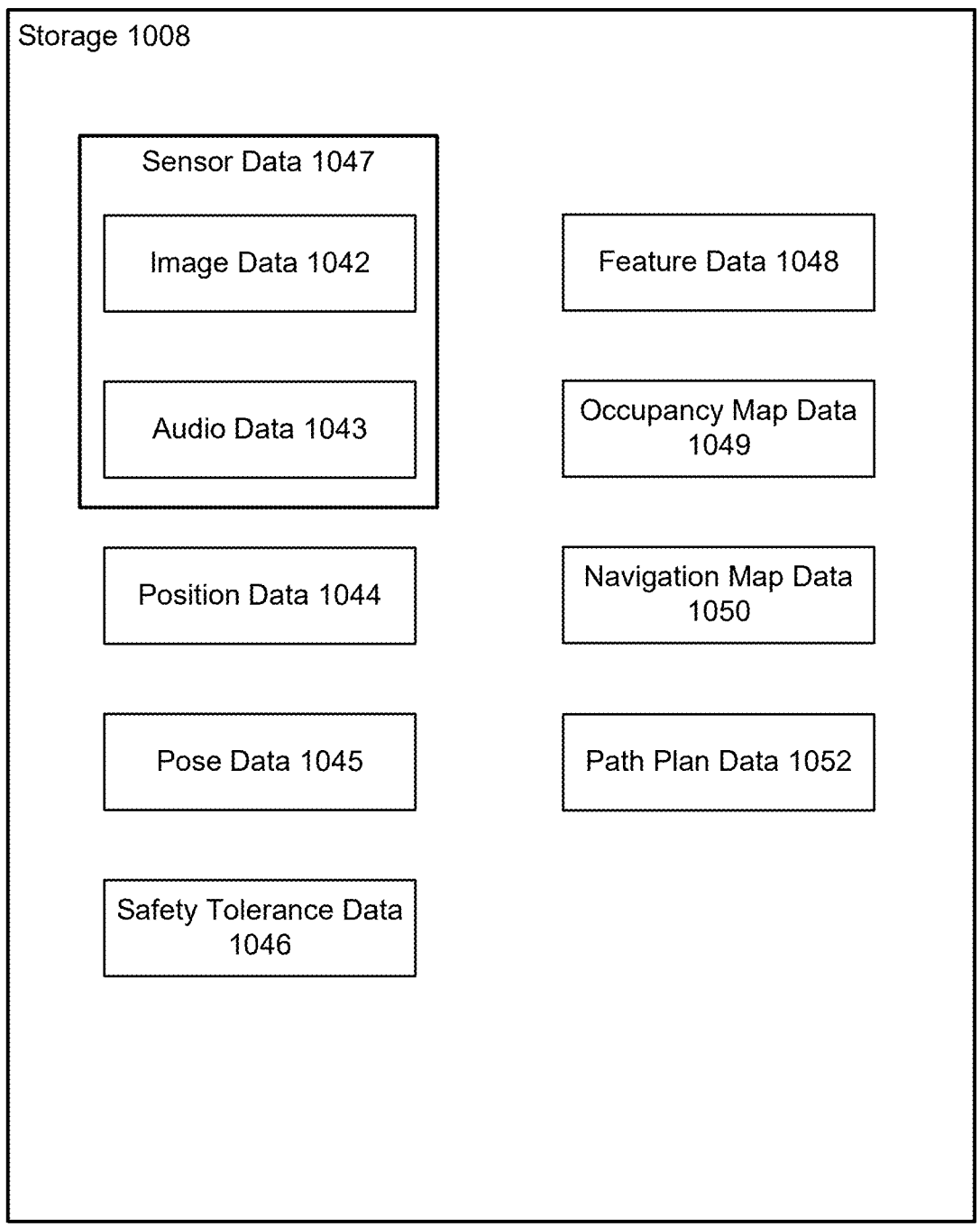
FIG. 10C illustrates data that may be stored in a storage of an autonomously motile device according to embodiments of the present disclosure.
Figure 10D:
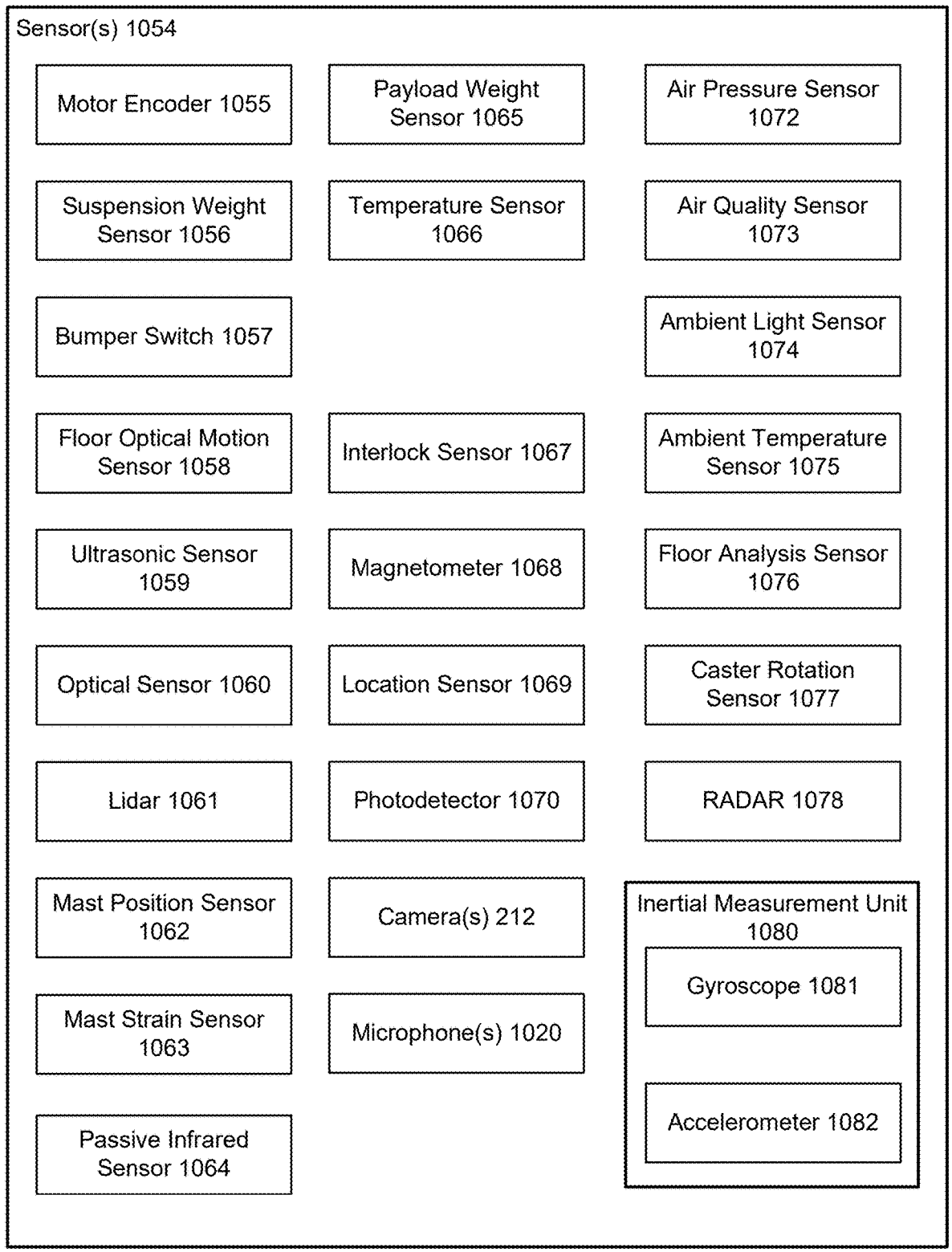
FIG. 10D illustrates sensors that may be included as part of an autonomously motile device according to embodiments of the present disclosure.

FIG. 10B illustrates components that may be stored in a memory of the device 110 according to embodiments of the present disclosure. Although illustrated as included in memory 1006, the components (or portions thereof) may also be included in hardware and/or firmware. FIG. 10C illustrates data that may be stored in a storage of the device 110 according to embodiments of the present disclosure. Although illustrated as stored in storage 1008, the data may be stored in memory 1006 or in another component. FIG. 10D illustrates sensors that may be included as part of the device 110 according to embodiments of the present disclosure.

A position determination component 1032 determines position data 1044 indicative of a position 384 of the feature 386 in the environment 390. In one implementation the position 384 may be expressed as a set of coordinates with respect to the first camera 312*a*. The position determination component 1032 may use a direct linear transformation triangulation process to determine the position 384 of a feature 386 in the environment 390 based on the difference in apparent location of that feature 386 in two images acquired by two cameras 312 separated by a known distance.

A movement determination module 1033 determines if the feature 386 is stationary or non-stationary. First position data 1044*a* indicative of a first position 384*a* of a feature 386 depicted in the first pair of images 382*a* acquired at time t_1 is determined by the position determination component 1032. Second position data 1044*b* of the same feature 386 indicative of a second position 384*b* of the same feature 386 as depicted in the second pair of images 382*b* acquired at time t_2 is determined as well. Similar determinations made for data relative to first position 384*a* and second position 384*b* may also be made for third position 384*c*, and so forth.

The movement determination module 1033 may use inertial data from the IMU 1080 or other sensors that provides information about how the device 110 moved between time t 1 and time t 2. The inertial data and the first position data 1044*a* is used to provide a predicted position of the feature 386 at the second time. The predicted position is compared to the second position data 1044*b* to determine if the feature is stationary or non-stationary. If the predicted position is less than a threshold value from the second position 384*b* in the second position data 1044*b*, then the feature 386 is deemed to be stationary.

Features 386 that have been deemed to be stationary may be included in the second feature data. The second feature data may thus exclude non-stationary features 386 and comprise a subset of the first feature data 1048 which comprises stationary features 386.

The second feature data may be used by a simultaneous localization and mapping (SLAM) component 1034. The SLAM component 1034 may use second feature data to determine pose data 1045 that is indicative of a location of the device 110 at a given time based on the appearance of features 386 in pairs of images 382. The SLAM component 1034 may also provide trajectory data indicative of the trajectory 380 that is based on a time series of pose data 1045 from the SLAM component 1034.

Other information, such as depth data from a depth sensor, the position data 1044 associated with the features 386 in the second feature data, and so forth, may be used to determine the presence of obstacles 383 in the environment 390 as represented by an occupancy map as represented by occupancy map data 1049.

The occupancy map data 1049 may comprise data that indicates the location of one or more obstacles 383, such as a table, wall, stairwell, and so forth. In some implementations, the occupancy map data 1049 may comprise a plurality of cells with each cell of the plurality of cells representing a particular area in the environment 390. Data, such as occupancy values, may be stored that indicates whether an area of the environment 390 associated with the cell is unobserved, occupied by an obstacle 383, or is unoccupied. An obstacle 383 may comprise an object or feature that prevents or impairs traversal by the device 110. For example, an obstacle 383 may comprise a wall, stairwell, and so forth.

The occupancy map data 1049 may be manually or automatically determined. For example, during a learning phase the user may take the device 110 on a tour of the environment 390, allowing the mapping component 1030 of the device 110 to determine the occupancy map data 1049. The user may provide input data such as tags designating a particular obstacle type, such as "furniture" or "fragile". In another example, during subsequent operation, the device 110 may generate the occupancy map data 1049 that is indicative of locations and types of obstacles such as chairs, doors, stairwells, and so forth as it moves unattended through the environment 390.

Modules described herein, such as the mapping component 1030, may provide various processing functions such as de-noising, filtering, and so forth. Processing of sensor data 1047, such as image data from a camera 312, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1047. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 1047 or other data. For example, the ANN may be trained using a supervised learning algorithm such that object identifiers are associated with images of particular objects within training images provided to the ANN. Once trained, the ANN may be provided with the sensor data 1047 and produce output indicative of the object identifier.

A navigation map component 1035 uses the occupancy map data 1049 as input to generate a navigation map as represented by navigation map data 1050. For example, the navigation map component 1035 may produce the navigation map data 1050 by inflating or enlarging the apparent size of obstacles 383 as indicated by the occupancy map data 1049.

An autonomous navigation component 1036 provides the device 110 with the ability to navigate within the environment 390 without real-time human interaction. The autonomous navigation component 1036 may implement, or operate in conjunction with, the mapping component 1030 to determine one or more of the occupancy map data 1049, the navigation map data 1050, or other representations of the environment 390.

The device 110 autonomous navigation component 1036 may generate path plan data 1052 that is indicative of a path through the environment 390 from the current location to a destination location. The device 110 may then begin moving along the path.

While moving along the path, the device 110 may assess the environment 390 and update or change the path as appropriate. For example, if an obstacle 383 appears in the path, the mapping component 1030 may determine the presence of the obstacle 383 as represented in the occupancy map data 1049 and navigation map data 1050. The now updated navigation map data 1050 may then be used to plan an alternative path to the destination location.

The device 110 may utilize one or more task components 1041. The task component 1041 comprises instructions that, when executed, provide one or more functions. The task components 1041 may perform functions such as finding a user, following a user, present output on output devices of the device 110, perform sentry tasks by moving the device 110 through the environment 390 to determine the presence of unauthorized people, and so forth.

The device 110 includes one or more output devices, such as one or more of a motor, light, speaker, display, projector, printer, and so forth. One or more output devices may be used to provide output during operation of the device 110.

The device 110 may use the network interfaces 1019 to connect to network(s) 199. For example, the network(s) 199 may comprise a wireless local area network, that in turn is connected to a wide area network such as the Internet.

The device 110 may be configured to dock or connect to a docking station. The docking station may also be connected to the network(s) 199. For example, the docking station may be configured to connect to the network(s) 199 (e.g., wireless local area network) such that the docking station and the device 110 may communicate. The docking station may provide external power which the device 110 may use to charge a battery of the device 110.

The device 110 may access one or more servers of the system(s) 120 via the network(s) 199. For example, the device 110 may utilize a wakeword detection component to determine if the user is addressing a request to the device 110. The wakeword detection component may hear a specified word or phrase and transition the device 110 or portion thereof to the wake operating mode. Once in the wake operating mode, the device 110 may then transfer at least a portion of the audio spoken by the user to one or more servers for further processing. The servers may process the spoken audio and return to the device 110 data that may be subsequently used to operate the device 110.

The device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomously motile devices may use the systems and techniques described herein. For example, the device 110 may comprise an autonomous ground vehicle that is moving on a street, an autonomous aerial vehicle in the air, autonomous marine vehicle, and so forth.

The device 110 may include one or more batteries (not shown) to provide electrical power suitable for operating the components in the device 110. In some implementations other devices may be used to provide electrical power to the device 110. For example, power may be provided by wireless power transfer, capacitors, fuel cells, storage flywheels, and so forth.

One or more clocks may provide information indicative of date, time, ticks, and so forth. For example, the processor 1004 may use data from the clock to associate a particular time with an action, sensor data 1047, and so forth.

The device 110 may include one or more hardware processors 1004 (processors) configured to execute one or more stored instructions. The processors 1004 may comprise one or more cores. The processors 1004 may include microcontrollers, systems on a chip, field programmable gate arrays, digital signal processors, graphic processing units, general processing units, and so forth.

The device 110 may include one or more communication component 1040 such as input/output (I/O) interfaces 1002, network interfaces 1019, and so forth. The communication component 1040 enable the device 110, or components thereof, to communicate with other devices or components. The communication component 1040 may include one or more I/O interfaces 1002. The I/O interfaces 1002 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1002 may couple to one or more I/O devices. The I/O devices may include input devices such as one or more of a sensor 1054, keyboard, mouse, scanner, and so forth. The I/O devices may also include output devices such as one or more of a motor, light, speaker 1012, display 314, projector, printer, and so forth. In some embodiments, the I/O devices may be physically incorporated with the device 110 or may be externally placed.

The I/O interface(s) 1002 may be configured to provide communications between the device 110 and other devices such as other devices 110, docking stations, routers, access points, and so forth, for example through antenna 1010 and/or other component. The I/O interface(s) 1002 may include devices configured to couple to personal area networks (PANs), local area networks (LANs), wireless local area networks (WLANS), wide area networks (WANs), and so forth. For example, the network interfaces 1019 may include devices compatible with Ethernet, Wi-Fi, Bluetooth, Bluetooth Low Energy, ZigBee, and so forth. The device 110 may also include one or more busses 1024 or other internal communications hardware or software that allow for the transfer of data between the various modules and components of the device 110.

As shown in FIG. 10A, the device 110 includes one or more memories 1006. The memory 1006 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1006 provides storage of computer-readable instructions, data structures, program modules, and other data for the operation of the device 110. A few example functional modules are shown stored in the memory 1006, although the same functionality may alternatively be implemented in hardware, firmware, or as a system on a chip (SoC).

The memory 1006 may include at least one operating system (OS) component 1039. The OS component 1039 is configured to manage hardware resource devices such as the I/O interfaces 1002, the I/O devices, the communication component 1040, and provide various services to applications or modules executing on the processors 1004. The OS component 1039 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Washington.

Also stored in the memory 1006, or elsewhere may be a data store 1008 and one or more of the following modules. These modules may be executed as foreground applications, background tasks, daemons, and so forth. The data store 1008 may use a flat file, database, linked list, tree, executable code, script, or other data structure to store information. In some implementations, the data store 1008 or a portion of the data store 1008 may be distributed across one or more other devices including other devices 110, system(s) 120, network attached storage devices, and so forth.

A communication component 1040 may be configured to establish communication with other devices, such as other devices 110, an external server of the system(s) 120, a docking station, and so forth. The communications may be authenticated, encrypted, and so forth.

Other modules within the memory 1006 may include a safety component 1029, the mapping component 1030, the navigation map component 1035, the autonomous navigation component 1036, the one or more components 1041, a speech processing component 1037, or other components. The components may access data stored within the data store 1008, including safety tolerance data 1046, sensor data 1047, inflation parameters, other data, and so forth.

The safety component 1029 may access the safety tolerance data 1046 to determine within what tolerances the device 110 may operate safely within the environment 390. For example, the safety component 1029 may be configured to stop the device 110 from moving when an extensible mast of the device 110 is extended. In another example, the safety tolerance data 1046 may specify a minimum sound threshold which, when exceeded, stops all movement of the device 110. Continuing this example, detection of sound such as a human yell would stop the device 110. In another example, the safety component 1029 may access safety tolerance data 1046 that specifies a minimum distance from an object that the device 110 is to maintain. Continuing this example, when a sensor 1054 detects an object has approached to less than the minimum distance, all movement of the device 110 may be stopped. Movement of the device 110 may be stopped by one or more of inhibiting operations of one or more of the motors, issuing a command to stop motor operation, disconnecting power from one or more the motors, and so forth. The safety component 1029 may be implemented as hardware, software, or a combination thereof.

The safety component 1029 may control other factors, such as a maximum speed of the device 110 based on information obtained by the sensors 1054, precision and accuracy of the sensor data 1047, and so forth. For example, detection of an object by an optical sensor may include some error, such as when the distance to an object comprises a weighted average between an object and a background. As a result, the maximum speed permitted by the safety component 1029 may be based on one or more factors such as the weight of the device 110, nature of the floor, distance to the object, and so forth. In the event that the maximum permissible speed differs from the maximum speed permitted by the safety component 1029, the lesser speed may be utilized.

The navigation map component 1035 uses the occupancy map data 1049 as input to generate the navigation map data 1050. The navigation map component 1035 may produce the navigation map data 1050 to inflate or enlarge the obstacles 383 indicated by the occupancy map data 1049. One or more inflation parameters may be used during operation. The inflation parameters provide information such as inflation distance, inflation adjustment values, and so forth. In some implementations the inflation parameters may be based at least in part on the sensor field-of-view, sensor blind spot, physical dimensions of the device 110, and so forth.

The speech processing component 1037 may be used to process utterances of the user. Microphones may acquire audio in the presence of the device 110 and may send raw audio data 1043 to an acoustic front end (AFE). The AFE may transform the raw audio data 1043 (for example, a single-channel, 16-bit audio stream sampled at 16 kHz), captured by the microphone, into audio feature vectors that may ultimately be used for processing by various components, such as a wakeword detection module 1038, speech recognition engine, or other components. The AFE may reduce noise in the raw audio data 1043. The AFE may also perform acoustic echo cancellation (AEC) or other operations to account for output audio data that may be sent to a speaker of the device 110 for output. For example, the device 110 may be playing music or other audio that is being received from network(s) 199 in the form of output audio data. To prevent the output audio interfering with the device's ability to detect and process input audio, the AFE or other component may perform echo cancellation to remove the output audio data from the input raw audio data 1043, or other operations.

The AFE may divide the raw audio data 1043 into frames representing time intervals for which the AFE determines a number of values (i.e., features) representing qualities of the raw audio data 1043, along with a set of those values (i.e., a feature vector or audio feature vector) representing features/qualities of the raw audio data 1043 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 1043, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 1043) may be input into a wakeword detection module 1038 that is configured to detect keywords spoken in the audio. The wakeword detection module 1038 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 1038 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 1038 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local device 110 may "wake" and begin transmitting audio data (which may include one or more of the raw audio data 1043 or the audio feature vectors) to one or more server(s) of the system(s) 120 for speech processing. The audio data corresponding to audio obtained by the microphone may be processed locally on one or more of the processors 1004, sent to a server for routing to a recipient device or may be sent to the system(s) 120 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the device 110 before processing by the navigation map component 1035, prior to sending to the server and/or the system(s) 120, and so forth.

The speech processing component 1037 may include or access an ASR module. The ASR module may accept as input raw audio data 1043, audio feature vectors, or other sensor data 1047 and so forth and may produce as output the input data comprising a text string or other data representation. The input data comprising the text string or other data representation may be processed by the navigation map component 1035 to determine the command to be executed. For example, the utterance of the command "robot, come here" may result in input data comprising the text string "come here". The wakeword "robot" may be omitted from the input data.

The autonomous navigation component 1036 provides the device 110 with the ability to navigate within the environment 390 without real-time human interaction. The autonomous navigation component 1036 may implement, or operate in conjunction with, the mapping component 1030 to determine the occupancy map data 1049, the navigation map data 1050, or other representation of the environment 390. In one implementation, the mapping component 1030 may use one or more simultaneous localization and mapping ("SLAM") techniques. The SLAM algorithms may utilize one or more of maps, algorithms, beacons, or other techniques to navigate. The autonomous navigation component 1036 may use the navigation map data 1050 to determine a set of possible paths along which the device 110 may move. One of these may be selected and used to determine path plan data 1052 indicative of a path. For example, a possible path that is the shortest or has the fewest turns may be selected and used to determine the path. The path is then subsequently used to determine a set of commands that drive the motors connected to the wheels. For example, the autonomous navigation component 1036 may determine the current location within the environment 390 and determine path plan data 1052 that describes the path to a destination location such as the docking station.

The autonomous navigation component 1036 may utilize various techniques during processing of sensor data 1047. For example, image data 1042 obtained from cameras 312 on the device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The device 110 may move responsive to a determination made by an onboard processor 1004, in response to a command received from one or more network interfaces 1019, as determined from the sensor data 1047, and so forth. For example, the system(s) 120 may send a command that is received using the network interface 1019. This command may direct the device 110 to proceed to find a particular user, follow a particular user, and so forth. The device 110 may then process this command and use the autonomous navigation component 1036 to determine the directions and distances associated with carrying out the command. For example, the command to "come here" may result in a task component 1041 sending a command to the autonomous navigation component 1036 to move the device 110 to a particular location near the user and orient the device 110 in a particular direction.

The device 110 may connect to the network(s) 199 using one or more of the network interfaces 1019. In some implementations, one or more of the modules or other functions described here may execute on the processors 1004 of the device 110, on the system(s) 120, or a combination thereof. For example, the system(s) 120 may provide various functions, such as ASR, natural language understanding (NLU), providing content such as audio or video to the device 110, and so forth.

The other components may provide other functionality, such as object recognition, speech synthesis, user identification, and so forth. The other components may comprise a speech synthesis module that is able to convert text data to human speech. For example, the speech synthesis module may be used by the device 110 to provide speech that a user is able to understand.

The data store 1008 may store the other data as well. For example, localization settings may indicate local preferences such as language, user identifier data may be stored that allows for identification of a particular user, and so forth.

As shown in FIG. 10D, the device 110 may include one or more of the following sensors 1054. The sensors 1054 depicted here are provided by way of illustration and not necessarily as a limitation. It is understood that other sensors 1054 may be included or utilized by the device 110, while some sensors 1054 may be omitted in some configurations.

A motor encoder 1055 provides information indicative of the rotation or linear extension of a motor. The motor may comprise a rotary motor, or a linear actuator. In some implementations, the motor encoder 1055 may comprise a separate assembly such as a photodiode and encoder wheel that is affixed to the motor. In other implementations, the motor encoder 1055 may comprise circuitry configured to drive the motor. For example, the autonomous navigation component 1036 may utilize the data from the motor encoder 1055 to estimate a distance traveled.

A suspension weight sensor 1056 provides information indicative of the weight of the device 110 on the suspension system for one or more of the wheels or the caster. For example, the suspension weight sensor 1056 may comprise a switch, strain gauge, load cell, photodetector, or other sensing element that is used to determine whether weight is applied to a particular wheel, or whether weight has been removed from the wheel. In some implementations, the suspension weight sensor 1056 may provide binary data such as a "1" value indicating that there is a weight applied to the wheel, while a "0" value indicates that there is no weight applied to the wheel. In other implementations, the suspension weight sensor 1056 may provide an indication such as so many kilograms of force or newtons of force. The suspension weight sensor 1056 may be affixed to one or more of the wheels or the caster. In some situations, the safety component 1029 may use data from the suspension weight sensor 1056 to determine whether or not to inhibit operation of one or more of the motors. For example, if the suspension weight sensor 1056 indicates no weight on the suspension, the implication is that the device 110 is no longer resting on its wheels, and thus operation of the motors may be inhibited. In another example, if the suspension weight sensor 1056 indicates weight that exceeds a threshold value, the implication is that something heavy is resting on the device 110 and thus operation of the motors may be inhibited.

One or more bumper switches 1057 provide an indication of physical contact between a bumper or other member that is in mechanical contact with the bumper switch 1057. The safety component 1029 utilizes sensor data 1047 obtained by the bumper switches 1057 to modify the operation of the device 110. For example, if the bumper switch 1057 associated with a front of the device 110 is triggered, the safety component 1029 may drive the device 110 backwards.

A floor optical motion sensor 1058 provides information indicative of motion of the device 110 relative to the floor or other surface underneath the device 110. In one implementation, the floor optical-motion sensors 1058 may comprise a light source such as light-emitting diode (LED), an array of photodiodes, and so forth. In some implementations, the floor optical-motion sensors 1058 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 1058 may provide other information, such as data indicative of a pattern present on the floor, composition of the floor, color of the floor, and so forth. For example, the floor optical-motion sensors 1058 may utilize an optoelectronic sensor that may detect different colors or shades of gray, and this data may be used to generate floor characterization data. The floor characterization data may be used for navigation.

An ultrasonic sensor 1059 utilizes sounds in excess of 20 kHz to determine a distance from the sensor 1054 to an object. The ultrasonic sensor 1059 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1059 may provide information indicative of a presence of an object, distance to the object, and so forth. Two or more ultrasonic sensors 1059 may be utilized in conjunction with one another to determine a location within a two-dimensional plane of the object.

In some implementations, the ultrasonic sensor 1059 or a portion thereof may be used to provide other functionality. For example, the emitter of the ultrasonic sensor 1059 may be used to transmit data and the detector may be used to receive data transmitted that is ultrasonic sound. In another example, the emitter of an ultrasonic sensor 1059 may be set to a particular frequency and used to generate a particular waveform such as a sawtooth pattern to provide a signal that is audible to an animal, such as a dog or a cat.

An optical sensor 1060 may provide sensor data 1047 indicative of one or more of a presence or absence of an object, a distance to the object, or characteristics of the object. The optical sensor 1060 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1060 may utilize one or more sensing elements. For example, the optical sensor 1060 may comprise a 4×4 array of light sensing elements. Each individual sensing element may be associated with a field of view that is directed in a different way. For example, the optical sensor 1060 may have four light sensing elements, each associated with a different 10° field-of-view, allowing the sensor to have an overall field-of-view of 40°.

In another implementation, a structured light pattern may be provided by the optical emitter. A portion of the structured light pattern may then be detected on the object using a sensor 1054 such as an image sensor or camera 312. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1060 may operate as a depth camera, providing a two-dimensional image of a scene, as well as data that indicates a distance to each pixel.

Data from the optical sensors 1060 may be utilized for collision avoidance. For example, the safety component 1029 and the autonomous navigation component 1036 may utilize the sensor data 1047 indicative of the distance to an object in order to prevent a collision with that object.

Multiple optical sensors 1060 may be operated such that their field-of-view overlap at least partially. To minimize or eliminate interference, the optical sensors 1060 may selectively control one or more of the timing, modulation, or frequency of the light emitted. For example, a first optical sensor 1060 may emit light modulated at 30 kHz while a second optical sensor 1060 emits light modulated at 33 kHz.

A lidar 1061 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 1047 may be generated that is indicative of the presence of objects and the relative positions, shapes, and so forth that are visible to the lidar 1061. Data from the lidar 1061 may be used by various modules. For example, the autonomous navigation component 1036 may utilize point cloud data generated by the lidar 1061 for localization of the device 110 within the environment 390.

The device 110 may include a mast. A mast position sensor 1062 provides information indicative of a position of the mast of the device 110. For example, the mast position sensor 1062 may comprise limit switches associated with the mast extension mechanism that indicate whether the mast is at an extended or retracted position. In other implementations, the mast position sensor 1062 may comprise an optical code on at least a portion of the mast that is then interrogated by an optical emitter and a photodetector to determine the distance to which the mast is extended. In another implementation, the mast position sensor 1062 may comprise an encoder wheel that is attached to a mast motor that is used to raise or lower the mast. The mast position sensor 1062 may provide data to the safety component 1029. For example, if the device 110 is preparing to move, data from the mast position sensor 1062 may be checked to determine if the mast is retracted, and if not, the mast may be retracted prior to beginning movement.

A mast strain sensor 1063 provides information indicative of a strain on the mast with respect to the remainder of the device 110. For example, the mast strain sensor 1063 may comprise a strain gauge or load cell that measures a sideload applied to the mast or a weight on the mast or downward pressure on the mast. The safety component 1029 may utilize sensor data 1047 obtained by the mast strain sensor 1063. For example, if the strain applied to the mast exceeds a threshold amount, the safety component 1029 may direct an audible and visible alarm to be presented by the device 110.

The device 110 may include a modular payload bay. A payload weight sensor 1065 provides information indicative of the weight associated with the modular payload bay. The payload weight sensor 1065 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1065 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1065 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1029 may utilize the payload weight sensor 1065 to determine if the modular payload bay has been overloaded. If so, an alert or notification may be issued.

One or more device temperature sensors 1066 may be utilized by the device 110. The device temperature sensors 1066 provide temperature data of one or more components within the device 110. For example, a device temperature sensor 1066 may indicate a temperature of one or more the batteries, one or more motors, and so forth. In the event the temperature exceeds a threshold value, the component associated with that device temperature sensor 1066 may be shut down.

One or more interlock sensors 1067 may provide data to the safety component 1029 or other circuitry that prevents the device 110 from operating in an unsafe condition. For example, the interlock sensors 1067 may comprise switches that indicate whether an access panel is open. The interlock sensors 1067 may be configured to inhibit operation of the device 110 until the interlock switch indicates a safe condition is present.

An inertial measurement unit (IMU) 1080 may include a plurality of gyroscopes 1081 and accelerometers 1082 arranged along different axes. The gyroscope 1081 may provide information indicative of rotation of an object affixed thereto. For example, a gyroscope 1081 may generate sensor data 1047 that is indicative of a change in orientation of the device 110 or a portion thereof.

The accelerometer 1082 provides information indicative of a direction and magnitude of an imposed acceleration. Data such as rate of change, determination of changes in direction, speed, and so forth may be determined using the accelerometer 1082. The accelerometer 1082 may comprise mechanical, optical, micro-electromechanical, or other devices. For example, the gyroscope 1081 in the accelerometer 1082 may comprise a prepackaged solid-state unit.

A magnetometer 1068 may be used to determine an orientation by measuring ambient magnetic fields, such as the terrestrial magnetic field. For example, the magnetometer 1068 may comprise a Hall effect transistor that provides output compass data indicative of a magnetic heading.

The device 110 may include one or more location sensors 1069. The location sensors 1069 may comprise an optical, radio, or other navigational system such as a global positioning system (GPS) receiver. For indoor operation, the location sensors 1069 may comprise indoor position systems, such as using Wi-Fi Positioning Systems (WPS). The location sensors 1069 may provide information indicative of a relative location, such as "living room" or an absolute location such as particular coordinates indicative of latitude and longitude, or displacement with respect to a predefined origin.

A photodetector 1070 provides sensor data 1047 indicative of impinging light. For example, the photodetector 1070 may provide data indicative of a color, intensity, duration, and so forth.

A camera 312 generates sensor data 1047 indicative of one or more images. The camera 312 may be configured to detect light in one or more wavelengths including, but not limited to, terahertz, infrared, visible, ultraviolet, and so forth. For example, an infrared camera 312 may be sensitive to wavelengths between approximately 700 nanometers and 1 millimeter. The camera 312 may comprise charge coupled devices (CCD), complementary metal oxide semiconductor (CMOS) devices, microbolometers, and so forth. The device 110 may use image data acquired by the camera 312 for object recognition, navigation, collision avoidance, user communication, and so forth. For example, a pair of cameras 312 sensitive to infrared light may be mounted on the front of the device 110 to provide binocular stereo vision, with the sensor data 1047 comprising images being sent to the autonomous navigation component 1036. In another example, the camera 312 may comprise a 10 megapixel or greater camera that is used for videoconferencing or for acquiring pictures for the user.

The camera 312 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 312, particularly those associated with navigation or autonomous operation, may utilize a global shutter. In other implementations, the camera(s) 312 providing images for use by the autonomous navigation component 1036 may be acquired using a rolling shutter and subsequently may be processed to mitigate image artifacts.

One or more microphones 1020 may be configured to acquire information indicative of sound present in the environment 390. In some implementations, arrays of microphones 1020 may be used. These arrays may implement beamforming techniques to provide for directionality of gain. The device 110 may use the one or more microphones 1020 to acquire information from acoustic tags, accept voice input from users, determine a direction of an utterance, determine ambient noise levels, for voice communication with another user or system, and so forth.

An air pressure sensor 1072 may provide information indicative of an ambient atmospheric pressure or changes in ambient atmospheric pressure. For example, the air pressure sensor 1072 may provide information indicative of changes in air pressure due to opening and closing of doors, weather events, and so forth.

An air quality sensor 1073 may provide information indicative of one or more attributes of the ambient atmosphere. For example, the air quality sensor 1073 may include one or more chemical sensing elements to detect the presence of carbon monoxide, carbon dioxide, ozone, and so forth. In another example, the air quality sensor 1073 may comprise one or more elements to detect particulate matter in the air, such as the photoelectric detector, ionization chamber, and so forth. In another example, the air quality sensor 1073 may include a hygrometer that provides information indicative of relative humidity.

An ambient light sensor 1074 may comprise one or more photodetectors or other light-sensitive elements that are used to determine one or more of the color, intensity, or duration of ambient lighting around the device 110.

An ambient temperature sensor 1075 provides information indicative of the temperature of the ambient environment 390 proximate to the device 110. In some implementations, an infrared temperature sensor may be utilized to determine the temperature of another object at a distance.

A floor analysis sensor 1076 may include one or more components that are used to generate at least a portion of floor characterization data. In one implementation, the floor analysis sensor 1076 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1076 may be used by one or more of the safety component 1029, the autonomous navigation component 1036, the task component 1041, and so forth. For example, if the floor analysis sensor 1076 determines that the floor is wet, the safety component 1029 may decrease the speed of the device 110 and generate a notification alerting the user.

The floor analysis sensor 1076 may include other components as well. For example, a coefficient of friction sensor may comprise a probe that comes into contact with the surface and determines the coefficient of friction between the probe and the floor.

A caster rotation sensor 1077 provides data indicative of one or more of a direction of orientation, angular velocity, linear speed of the caster, and so forth. For example, the caster rotation sensor 1077 may comprise an optical encoder and corresponding target that is able to determine that the caster transitioned from an angle of 0° at a first time to 49° at a second time.

The sensors 1054 may include a radar 1078. The radar 1078 may be used to provide information as to a distance, lateral position, and so forth, to an object.

The sensors 1054 may include a passive infrared (PIR) sensor 1064. The PIR 1064 sensor may be used to detect the presence of users, pets, hotspots, and so forth. For example, the PIR sensor 1064 may be configured to detect infrared radiation with wavelengths between 8 and 14 micrometers.

The device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 390 to provide landmarks for the autonomous navigation component 1036. One or more touch sensors may be utilized to determine contact with a user or other objects.

The device 110 may include one or more output devices. A motor (not shown) may be used to provide linear or rotary motion. A light 358 may be used to emit photons. A speaker 1012 may be used to emit sound. A display 314 may comprise one or more of a liquid crystal display, light emitting diode display, electrophoretic display, cholesteric liquid crystal display, interferometric display, and so forth. The display 314 may be used to present visible information such as graphics, pictures, text, and so forth. In some implementations, the display 314 may comprise a touchscreen that combines a touch sensor and a display 314.

In some implementations, the device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the device 110 may include a haptic output device that provides output that produces particular touch sensations to the user. Continuing the example, a motor with an eccentric weight may be used to create a buzz or vibration to allow the device 110 to simulate the purr of a cat.

As noted above, multiple devices may be employed in a single system. In such a multi-device system, each of the devices may include different components for performing different aspects of the system's processing. The multiple devices may include overlapping components. The components of the device 110 and/or the system(s) 120 as described herein, are illustrative, and may be located as a stand-alone device or may be included, in whole or in part, as a component of a larger device or system.

As illustrated in FIG. 12, multiple devices (110*a*-110*g* and 120) may contain components of the system and the devices may be connected over a network(s) 199. The network(s) 199 may include a local or private network or may include a wide network such as the Internet. Devices may be connected to the network(s) 199 through either wired or wireless connections. As illustrated in FIG. 12, a tablet computer 110*a*, a smart phone 110*b*, a smart watch 110*c*, speech-detection device(s) with a display 110*d*, speech-detection device(s) 110*e*, input/output (I/O) limited device 110*f*, and/or a motile device 110*g* (e.g., device capable of autonomous motion) may be connected to the network(s) 199 through a wired and/or wireless connection. For example, the devices 110 may be connected to the network(s) 199 via an Ethernet port, through a wireless service provider (e.g., using a WiFi or cellular network connection), over a wireless local area network (WLAN) (e.g., using WiFi or the like), over a wired connection such as a local area network (LAN), and/or the like.

Other devices are included as network-connected support devices, such as the system(s) 120 and/or other devices (not illustrated). The support devices may connect to the network(s) 199 through a wired connection or wireless connection. The devices 110 may capture audio using one-or-more built-in or connected microphones or other audio capture devices, with processing performed by ASR components, NLU components, or other components of the same device or another device connected via the network(s) 199, such as an ASR component, NLU component, etc. of the system(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    generating, by a device using a first sensor, first data representing a plurality of obstacles in an environment of the device;
    determining, based on the first data, second data, the second data including a first cluster of points corresponding to a first object from among the plurality of obstacles;
    determining, using the second data, a first location associated with the first object;
    generating, using a camera of the device, first image data representing a portion of the environment;
    determining that the first image data includes a representation of a first person;
    determining, using the first image data, first posture data associated with the first person;
    determining, using the first image data, a second location associated with the first person;
    determining that the second location is within a threshold distance of the first location;
    in response to determining that the second location is within the threshold distance of the first location, associating the first posture data with the first object;
    determining, based on the first posture data, that the first object is mobile; and
    generating, using the first data, map data indicating a subset of the plurality of obstacles, wherein the subset does not include the first object.

2. The computer-implemented method of claim 1, further comprising:
    determining a first speed value associated with a second object in the environment;
    determining that the first speed value is below a first threshold value;
    determining a second speed value associated with a third object in the environment;
    determining that the first image data includes a representation of a second person;
    determining that the second person corresponds to the third object;
    determining that the second speed value is above a second threshold value; and
    in response to determining that the second speed value is above the second threshold value, determining that the third object is mobile,
    wherein the subset of the plurality of obstacles includes the second object but does not include the third object.

3. A computer-implemented method, the method comprising:
    determining, by a device, a first location associated with a first object in an environment of the device;
    receiving first image data including a representation of a first person;
    determining, using the first image data, first posture data associated with the first person;
    determining that the first person corresponds to the first object;
    determining, based on the first posture data, that the first object is in motion relative to the first location;
    determining, using the first image data, that a second object is stationary; and
    generating map data indicating obstacles in the environment, wherein the map data includes the second object but does not include the first object.

4. The computer-implemented method of claim 3, further comprising:
    determining data associated with a plurality of objects in the environment, the data not including information about the first object,
    wherein the map data is generated using the data.

5. The computer-implemented method of claim 3, further comprising:
    generating, using a camera of the device, the first image data; and
    generating, using a sensor of the device, point cloud data representing the obstacles,
    wherein the first location is determined using the point cloud data, and the first image data is received from the camera by a processing component of the device.

6. The computer-implemented method of claim 3, wherein determining that the second object is stationary further comprises:
    determining a second location associated with the second object;
    determining, using the first image data, second posture data associated with a second person represented in the first image data;
    determining that the second person corresponds to the second object; and
    determining, based on the second posture data, that the second object is stationary.

7. The computer-implemented method of claim 3, further comprising:
    determining, using the first image data, a second location associated with the first person; and
    determining a distance value between the first location and the second location,
    wherein determining that the first person corresponds to the first object further comprises determining that the distance value is less than a threshold value.

8. The computer-implemented method of claim 3, further comprising:
    determining, by the device, a second location associated with the second object;

determining a first value corresponding to a first likelihood that the first posture data corresponds to the first object; and determining a second value corresponding to a second likelihood that the first posture data corresponds to the second object, wherein determining that the first person corresponds to the first object further comprises determining that the first value exceeds the second value.

9. The computer-implemented method of claim 3, further comprising:

generating, by the device, point cloud data representing the obstacles;

determining first cluster data including a first cluster of points represented in the point cloud data, the first cluster of points corresponding to the first object; and determining, using the first cluster data, a first speed value associated with the first object.

10. The computer-implemented method of claim 3, further comprising:

determining a first speed value associated with the second object;

determining that the first speed value is below a first threshold value;

determining a second speed value associated with a third object in the environment;

determining that the first image data includes a representation of a second person;

determining that the second person corresponds to the third object;

determining that the second speed value is above a second threshold value; and in response to determining that the second speed value is above the second threshold value, determining that the third object is in motion, wherein the map data includes the second object but does not include the first object or the third object.

11. The computer-implemented method of claim 3, further comprising:

determining a second location indicated by second posture data;

determining a first speed value associated with the second object;

determining that the first speed value is below a first threshold value;

determining a second speed value associated with a third object in the environment;

determining that the third object corresponds to the second location;

determining that the second speed value is above a second threshold value; and in response to determining that the second speed value is above the second threshold value, determining that the third object is in motion, wherein the map data includes the second object but does not include the first object or the third object.

12. A system comprising:
at least one processor; and
memory including instructions operable to be executed by the at least one processor to cause the system to:
generate, by a device, point cloud data representing obstacles in an environment of the device;
determine, using the point cloud data, a first location of a first object in the environment;
determine a second location of a first person;
determine first posture data associated with the first person;
determine that a distance value between the first location and the second location is less than a first threshold value;
in response to determining that the distance value is less than the first threshold value, determine that the first object corresponds to the first person; and
determine, based on the first posture data, that the first object is in motion.

13. The system of claim 12, wherein the memory further comprises instructions that, when executed by the at least one processor, further cause the system to:

determine data associated with a plurality of objects in the environment, the data not including information about the first object; and generate map data using the data.

14. The system of claim 12, wherein the memory further comprises instructions that, when executed by the at least one processor, further cause the system to:

generate, using a camera of the device, first image data; and generate, using a sensor of the device, the point cloud data.

15. The system of claim 12, wherein the memory further comprises instructions that, when executed by the at least one processor, further cause the system to:

determine a third location associated with a second object in the environment;

determine second posture data associated with a second person;

determine that the second person corresponds to the second object;

determine, based on the second posture data, that the second object is stationary; and generate map data indicating a subset of a plurality of obstacles in the environment, wherein the map data includes the second object but does not include the first object.

16. The system of claim 12, wherein the memory further comprises instructions that, when executed by the at least one processor, further cause the system to:

determine, using the distance value, a first value corresponding to a first likelihood that the first posture data corresponds to the first object;

determine, by the device, a third location associated with a second object in the environment;

determine a second value corresponding to a second likelihood that the first posture data corresponds to the second object; and determine that the first person corresponds to the first object based on the first value exceeding the second value.

17. The system of claim 12, wherein the memory further comprises instructions that, when executed by the at least one processor, further cause the system to:

determine first cluster data including a first cluster of points represented in the point cloud data, the first cluster of points corresponding to the first object; and determine, using the first cluster data, a first speed value associated with the first object.

18. The system of claim 12, wherein the memory further comprises instructions that, when executed by the at least one processor, further cause the system to:

determine a first speed value associated with a second object in the environment;

determine that the first speed value is below a second threshold value;

determine a second speed value associated with a third object in the environment;
determine that first image data includes a representation of a second person;
determine that the second person corresponds to the third object;
determine that the second speed value is above a third threshold value;
in response to determining that the second speed value is above the third threshold value, determine that the third object is in motion; and
generate map data indicating a subset of a plurality of obstacles in the environment, wherein the map data includes the second object but does not include the first object or the third object.

19. The system of claim 12, wherein the memory further comprises instructions that, when executed by the at least one processor, further cause the system to:
determine a third location indicated by posture data;
determine a first speed value associated with a second object in the environment;
determine that the first speed value is below a second threshold value;
determine a second speed value associated with a third object in the environment;
determine that the third object corresponds to the third location;
determine that the second speed value is above a third threshold value;
in response to determining that the second speed value is above the third threshold value, determine that the third object is in motion; and
generate map data indicating a subset of a plurality of obstacles in the environment, wherein the map data includes the second object but does not include the first object or the third object.

20. A computer-implemented method, the method comprising:
generating, by a device, point cloud data representing obstacles in an environment;
determining first cluster data including a first cluster of points represented in the point cloud data, the first cluster of points corresponding to a first object;
determining, using the first cluster data, a first location associated with the first object;
determining a second location of a first person;
determining first posture data associated with the first person;
determining that a distance value between the first location and the second location is less than a first threshold value;
in response to determining that the distance value is less than the first threshold value, determining that the first person corresponds to the first object; and
determining, based on the first posture data, that the first object is in motion.

* * * * *